United States Patent
Patel et al.

(10) Patent No.: US 10,425,970 B2
(45) Date of Patent: Sep. 24, 2019

(54) PRECODING MANAGEMENT FOR RANDOM ACCESS PROCEDURES

(71) Applicant: QUALCOMM Incorporated, San Diego, CA (US)

(72) Inventors: Shimman Arvind Patel, San Diego, CA (US); Wanshi Chen, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 15 days.

(21) Appl. No.: 15/694,065

(22) Filed: Sep. 1, 2017

(65) Prior Publication Data

US 2018/0098359 A1    Apr. 5, 2018

Related U.S. Application Data

(60) Provisional application No. 62/402,758, filed on Sep. 30, 2016.

(51) Int. Cl.
   *H04W 74/08* (2009.01)
   *H04B 7/0456* (2017.01)
   (Continued)

(52) U.S. Cl.
   CPC ...... *H04W 74/0833* (2013.01); *H04B 7/0404* (2013.01); *H04B 7/0456* (2013.01);
   (Continued)

(58) Field of Classification Search
   CPC .. H04B 7/0456; H04B 7/0684; H04B 7/0404; H04B 7/0639; H04B 7/0634;
   (Continued)

(56) References Cited

U.S. PATENT DOCUMENTS 8,923,427 B2    12/2014    Gomadam
9,380,466 B2     6/2016    Eyuboglu et al.
(Continued)

FOREIGN PATENT DOCUMENTS

WO    WO2015135596 A1    9/2015
WO    WO-2016086144 A1   6/2016
(Continued)

OTHER PUBLICATIONS

ISA/EP, International Search Report and Written Opinion of the International Searching Authority, Int'l Application No. PCT/US2017/050005, dated Feb. 26, 2018, European Patent Office, Rijswijk, NL, 25 pgs.

(Continued)

*Primary Examiner* — Brian D Nguyen
(74) *Attorney, Agent, or Firm* — Holland & Hart LLP

(57) ABSTRACT

Techniques are described for wireless communication. A method for wireless communication at a user equipment (UE) includes transmitting precoder selection signals from at least two antennas of the UE during performance of a random access procedure over a wireless network; and receiving, from the wireless network during the random access procedure, an indication of a refined precoding setting for the UE. A method for wireless communication at a network access device includes receiving, from a UE during a random access procedure performed by the UE, precoder selection signals from at least two antennas of the UE; identifying a refined precoding setting for the UE based at least in part on the received precoder selection signals; and transmitting an indication of the refined precoding setting to the UE.

41 Claims, 26 Drawing Sheets

(51) Int. Cl.
*H04B 7/06* (2006.01)
*H04W 72/04* (2009.01)
*H04B 7/0404* (2017.01)
*H04L 5/00* (2006.01)

(52) U.S. Cl.
CPC ......... *H04B 7/0634* (2013.01); *H04B 7/0639* (2013.01); *H04B 7/0684* (2013.01); *H04L 5/0048* (2013.01); *H04L 5/0053* (2013.01); *H04W 72/042* (2013.01); *H04W 72/0406* (2013.01); *H04W 72/048* (2013.01)

(58) Field of Classification Search
CPC ......... H04W 72/0406; H04W 74/0833; H04W 72/048; H04W 72/042; H04L 5/0048; H04L 5/0053
See application file for complete search history.

(56) References Cited

U.S. PATENT DOCUMENTS

| | | | |
|---|---|---|---|
| 2011/0019694 A1 | 1/2011 | Kwon et al. | |
| 2012/0314664 A1 | 12/2012 | Johansson et al. | |
| 2015/0009951 A1* | 1/2015 | Josiam | H04L 25/0224 370/330 |
| 2015/0103800 A1* | 4/2015 | Seo | H04W 56/00 370/330 |
| 2016/0056875 A1* | 2/2016 | Kang | H04B 7/0456 370/329 |
| 2017/0054481 A1* | 2/2017 | Dinan | H04B 7/0456 |
| 2017/0201308 A1* | 7/2017 | Park | H04B 17/24 |
| 2017/0214443 A1* | 7/2017 | Chen | H04B 7/04 |
| 2017/0346540 A1* | 11/2017 | Kang | H04B 7/04 |
| 2018/0123654 A1* | 5/2018 | Park | H04B 7/04 |

FOREIGN PATENT DOCUMENTS

| | | |
|---|---|---|
| WO | WO-2016120761 A1 | 8/2016 |
| WO | WO-2016153176 A1 | 9/2016 |
| WO | WO2017039510 A1 | 3/2017 |
| WO | WO2017074497 A1 | 5/2017 |

OTHER PUBLICATIONS

ISA/EPO, Partial International Search Report of the International Searching Authority, Int'l. App. No. PCT/US2017/050005, dated Nov. 21, 2017, European Patent Office, Rijswijk, NL, 18 pgs.
Samsung, "Random Access Procedure in NR," 3GPP TSG-RAN WG2 Meeting #94, R2-163372, Nanjing, China, May 23-27, 2016, 7 pgs., XP051104903, 3rd Generation Partnership Project.
Vodafone et al., "Way Forward on UE Capability Indication," 3GPP TSG RAN WG2 Meeting #87, R2-143859, Dresden, Germany, Aug. 23-27, 2014, 2 pgs., XP050820236, 3rd Generation Partnership Project.

* cited by examiner

PRECODING MANAGEMENT FOR RANDOM ACCESS PROCEDURES

CROSS REFERENCES

The present Application for Patent claims priority to U.S. Provisional Patent Application No. 62/402,758 by Patel et al., entitled "PRECODING MANAGEMENT FOR RANDOM ACCESS PROCEDURES," filed Sep. 30, 2016, assigned to the assignee hereof, and which is hereby expressly incorporated by reference herein in its entirety.

INTRODUCTION

The present disclosure, for example, relates to wireless communication systems, and more particularly to precoding management for random access procedures.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

A wireless multiple-access communication system may include a number of network access devices, each simultaneously supporting communication for multiple communication devices, otherwise known as user equipment (UEs). In a Long-Term Evolution (LTE) or LTE-Advanced (LTE-A) network, a network access device may take the form of a base station, with a set of one or more base stations defining an eNodeB (eNB). In other examples (e.g., in a next generation new radio (NR) or 5G network), a network access device may take the form of a smart radio head (or radio head (RH)) or access node controller (ANC), with a set of smart radio heads in communication with an ANC defining an eNB. A base station or smart radio head may communicate with a set of UEs on downlink channels (e.g., for transmissions from a base station or smart radio head to a UE) and uplink channels (e.g., for transmissions from a UE to a base station or smart radio head).

When initially accessing a wireless network, or when accessing a wireless network after a period of time, a UE may perform a random access procedure to gain access to the wireless network.

SUMMARY

A method of wireless communication is described. The method may include receiving, from a UE during a random access procedure performed by the UE, precoder selection signals from at least two antennas of the UE, at least one of the precoder selection signals including a first measurement reference signal (MRS) from a first antenna of the UE and transmitting an indication of a refined precoding setting to the UE based at least in part on the received precoder selection signals.

An apparatus for wireless communication is described. The apparatus may include means for receiving, from a UE during a random access procedure performed by the UE, precoder selection signals from at least two antennas of the UE, at least one of the precoder selection signals including a first MRS from a first antenna of the UE and means for transmitting an indication of a refined precoding setting to the UE based at least in part on the received precoder selection signals.

Another apparatus for wireless communication is described. The apparatus may include a processor, memory in electronic communication with the processor, and instructions stored in the memory. The instructions may be operable to cause the processor to receive, from a user equipment UE during a random access procedure performed by the UE, precoder selection signals from at least two antennas of the UE, at least one of the precoder selection signals including a first MRS from a first antenna of the UE and transmit an indication of a refined precoding setting to the UE based at least in part on the received precoder selection signals.

A non-transitory computer readable medium for wireless communication is described. The non-transitory computer-readable medium may include instructions operable to cause a processor to receive, from a UE during a random access procedure performed by the UE, precoder selection signals from at least two antennas of the UE, at least one of the precoder selection signals including a first MRS from a first antenna of the UE and transmit an indication of a refined precoding setting to the UE based at least in part on the received precoder selection signals.

In some examples of the method, apparatus, and non-transitory computer-readable medium described above, at least one of the precoder selection signals comprises a second MRS from a second antenna of the UE. In some examples of the method, apparatus, and non-transitory computer-readable medium described above, the first MRS may be received with at least one of: a physical random access channel (PRACH) transmission, or an enhanced PRACH (ePRACH) transmission, or an initial physical uplink shared channel (PUSCH) transmission, or a combination thereof.

Some examples of the method, apparatus, and non-transitory computer-readable medium described above may further include processes, features, means, or instructions for receiving, from the UE during the random access procedure, an ePRACH transmission or an initial PUSCH transmission using a first precoder based at least in part on the indication of the refined precoding setting, or a second precoder used by the UE during a prior successful random access procedure. Some examples of the method, apparatus, and non-transitory computer-readable medium described above may further include processes, features, means, or instructions for transmitting the indication of the refined precoding setting to be applied to a transmission during the random access procedure. Some examples of the method, apparatus, and non-transitory computer-readable medium described above may further include processes, features, means, or instructions for transmitting the indication of the refined precoding setting to be applied to a transmission following the random access procedure.

A method of wireless communication is described. The method may include receiving, from a UE during a random access procedure performed by the UE, precoder selection signals from at least two antennas of the UE, identifying a refined precoding setting for the UE based at least in part on the received precoder selection signals, and transmitting an indication of the refined precoding setting to the UE.

An apparatus for wireless communication is described. The apparatus may include means for receiving, from a UE during a random access procedure performed by the UE, precoder selection signals from at least two antennas of the UE, means for identifying a refined precoding setting for the UE based at least in part on the received precoder selection signals, and means for transmitting an indication of the refined precoding setting to the UE.

Another apparatus for wireless communication is described. The apparatus may include a processor, memory in electronic communication with the processor, and instructions stored in the memory. The instructions may be operable to cause the processor to receive, from a UE during a random access procedure performed by the UE, precoder selection signals from at least two antennas of the UE, identify a refined precoding setting for the UE based at least in part on the received precoder selection signals, and transmit an indication of the refined precoding setting to the UE.

A non-transitory computer readable medium for wireless communication is described. The non-transitory computer-readable medium may include instructions operable to cause a processor to receive, from a UE during a random access procedure performed by the UE, precoder selection signals from at least two antennas of the UE, identify a refined precoding setting for the UE based at least in part on the received precoder selection signals, and transmit an indication of the refined precoding setting to the UE.

Some examples of the method, apparatus, and non-transitory computer-readable medium described above may further include processes, features, means, or instructions for transmitting, during performance of the random access procedure, a transmission including at least one of: a random access response (RAR) grant, downlink control information (DCI) scheduling information for an initial PUSCH transmission of the UE, or a combination thereof.

In some examples of the method, apparatus, and non-transitory computer-readable medium described above, the same transmission comprises at least one precoder selection signal parameter, the at least one precoder selection signal parameter including: a bandwidth of the precoder selection signals, a cyclic shift of the precoder selection signals, a number of antenna ports from which to transmit the precoder selection signals, or a combination thereof. In some examples of the method, apparatus, and non-transitory computer-readable medium described above, the same transmission comprises the indication of the refined precoding setting.

Some examples of the method, apparatus, and non-transitory computer-readable medium described above may further include processes, features, means, or instructions for receiving at least one transmission from the UE in accordance with the indicated refined precoding setting, the at least one transmission including: an initial PUSCH transmission, a retransmission of the initial PUSCH transmission, or a combination thereof.

In some examples of the method, apparatus, and non-transitory computer-readable medium described above, the refined precoding setting may be identified based at least in part on: the precoder selection signals, prior-transmitted precoder selection signals transmitted during a prior random access procedure, or a combination thereof.

A method of wireless communication is described. The method may include receiving, from a UE during a random access procedure performed by the UE, precoder selection signals from at least two antennas of the UE, transmitting an indication of a refined precoding setting to the UE based at least in part on the received precoder selection signals, and transmitting system information including a first indication of a first set of resources associated with a single antenna random access procedure and a second indication of a second set of resources associated with multiple antenna random access procedures.

An apparatus for wireless communication is described. The apparatus may include means for receiving, from a UE during a random access procedure performed by the UE, precoder selection signals from at least two antennas of the UE, means for transmitting an indication of a refined precoding setting to the UE based at least in part on the received precoder selection signals, and means for transmitting system information including a first indication of a first set of resources associated with a single antenna random access procedure and a second indication of a second set of resources associated with multiple antenna random access procedures.

Another apparatus for wireless communication is described. The apparatus may include a processor, memory in electronic communication with the processor, and instructions stored in the memory. The instructions may be operable to cause the processor to receive, from a UE during a random access procedure performed by the UE, precoder selection signals from at least two antennas of the UE, transmit an indication of a refined precoding setting to the UE based at least in part on the received precoder selection signals, and transmit system information including a first indication of a first set of resources associated with a single antenna random access procedure and a second indication of a second set of resources associated with multiple antenna random access procedures.

A non-transitory computer readable medium for wireless communication is described. The non-transitory computer-readable medium may include instructions operable to cause a processor to receive, from a UE during a random access procedure performed by the UE, precoder selection signals from at least two antennas of the UE, transmit an indication of a refined precoding setting to the UE based at least in part on the received precoder selection signals, and transmit system information including a first indication of a first set of resources associated with a single antenna random access procedure and a second indication of a second set of resources associated with multiple antenna random access procedures.

Some examples of the method, apparatus, and non-transitory computer-readable medium described above may further include processes, features, means, or instructions for transmitting system information including: a first indication that precoder selection signal reception may be enabled, a second indication of a type of precoder selection signal reception that may be enabled, or a combination thereof, wherein the precoder selection signals may be received in response to transmitting at least the first indication or the second indication.

Some examples of the method, apparatus, and non-transitory computer-readable medium described above may further include processes, features, means, or instructions for identifying a capability of the UE based at least in part on the received precoder selection signals. In some examples of the method, apparatus, and non-transitory computer-readable medium described above, the precoder selection signals may be received with at least one of: a PRACH transmission, or an ePRACH transmission, or an initial PUSCH transmission, or a combination thereof.

A method of wireless communication is described. The method may include receiving, from a UE during a random access procedure performed by the UE, precoder selection signals from at least two antennas of the UE, the precoder selection signals including a first demodulation reference signal (DMRS) and a first part of a data transmission received from at least a first antenna of the UE in accordance with a first precoder and a preconfigured precoder cycling and transmitting an indication of a refined precoding setting to the UE based at least in part on the received precoder selection signals.

An apparatus for wireless communication is described. The apparatus may include means for receiving, from a UE during a random access procedure performed by the UE, precoder selection signals from at least two antennas of the UE, the precoder selection signals including a first DMRS and a first part of a data transmission received from at least a first antenna of the UE in accordance with a first precoder and a preconfigured precoder cycling and means for transmitting an indication of a refined precoding setting to the UE based at least in part on the received precoder selection signals.

Another apparatus for wireless communication is described. The apparatus may include a processor, memory in electronic communication with the processor, and instructions stored in the memory. The instructions may be operable to cause the processor to receive, from a user equipment UE during a random access procedure performed by the UE, precoder selection signals from at least two antennas of the UE, the precoder selection signals including a first DMRS and a first part of a data transmission received from at least a first antenna of the UE in accordance with a first precoder and a preconfigured precoder cycling and transmit an indication of a refined precoding setting to the UE based at least in part on the received precoder selection signals.

A non-transitory computer readable medium for wireless communication is described. The non-transitory computer-readable medium may include instructions operable to cause a processor to receive, from a UE during a random access procedure performed by the UE, precoder selection signals from at least two antennas of the UE, the precoder selection signals including a first DMRS and a first part of a data transmission received from at least a first antenna of the UE in accordance with a first precoder and a preconfigured precoder cycling and transmit an indication of a refined precoding setting to the UE based at least in part on the received precoder selection signals.

In some examples of the method, apparatus, and non-transitory computer-readable medium described above, the precoder selection signals further comprise a second DMRS and a second part of the data transmission received from at least a second antenna of the UE, in accordance with a second precoder and the preconfigured precoder cycling, the second precoder being different from the first precoder.

In some examples of the method, apparatus, and non-transitory computer-readable medium described above, receiving the precoder selection signals comprises: receiving the first DMRS and the first part of the data transmission from the first antenna of the UE, in accordance with a preconfigured antenna rotation. Some examples of the method, apparatus, and non-transitory computer-readable medium described above may further include processes, features, means, or instructions for receiving the second DMRS and the second part of the data transmission from the second antenna of the UE, in accordance with the preconfigured antenna rotation.

Some examples of the method, apparatus, and non-transitory computer-readable medium described above may further include processes, features, means, or instructions for determining a first error rate associated with the first part of the data transmission. Some examples of the method, apparatus, and non-transitory computer-readable medium described above may further include processes, features, means, or instructions for determining a second error rate associated with the second part of the data transmission, wherein the indication of the refined precoding setting may be based at least in part on the first error rate and the second error rate.

In some examples of the method, apparatus, and non-transitory computer-readable medium described above, the data transmission comprises a data payload of an ePRACH transmission or an initial PUSCH transmission.

A method of wireless communication is described. The method may include transmitting, during a random access procedure, precoder selection signals from at least two antennas of the UE, at least one of the precoder selection signals including a first MRS from a first antenna of the UE and receiving, during the random access procedure, an indication of a refined precoding setting based at least in part on the transmitted precoder selection signals.

An apparatus for wireless communication is described. The apparatus may include means for transmitting, during a random access procedure, precoder selection signals from at least two antennas of the UE, at least one of the precoder selection signals including a first MRS from a first antenna of the UE and means for receiving, during the random access procedure, an indication of a refined precoding setting based at least in part on the transmitted precoder selection signals.

Another apparatus for wireless communication is described. The apparatus may include a processor, memory in electronic communication with the processor, and instructions stored in the memory. The instructions may be operable to cause the processor to transmit, during a random access procedure, precoder selection signals from at least two antennas of the UE, at least one of the precoder selection signals including a first MRS from a first antenna of the UE and receive, during the random access procedure, an indication of a refined precoding setting based at least in part on the transmitted precoder selection signals.

A non-transitory computer readable medium for wireless communication is described. The non-transitory computer-readable medium may include instructions operable to cause a processor to transmit, during a random access procedure, precoder selection signals from at least two antennas of the UE, at least one of the precoder selection signals including a first MRS from a first antenna of the UE and receive, during the random access procedure, an indication of a refined precoding setting based at least in part on the transmitted precoder selection signals.

In some examples of the method, apparatus, and non-transitory computer-readable medium described above, at least one of the precoder selection signals comprises a second MRS from a second antenna of the UE. In some examples of the method, apparatus, and non-transitory computer-readable medium described above, the first MRS may be transmitted with at least one of: a PRACH transmission, or an ePRACH transmission, or an initial PUSCH transmission, or a combination thereof.

Some examples of the method, apparatus, and non-transitory computer-readable medium described above may further include processes, features, means, or instructions for transmitting, during the random access procedure, an ePRACH transmission or an initial PUSCH transmission using a first precoder based at least in part on the indication of the refined precoding setting, or a second precoder used by the UE during a prior successful random access procedure.

Some examples of the method, apparatus, and non-transitory computer-readable medium described above may further include processes, features, means, or instructions for applying the refined precoding setting to a transmission during the random access procedure. Some examples of the method, apparatus, and non-transitory computer-readable medium described above may further include processes, features, means, or instructions for applying the refined precoding setting to a transmission following the random access procedure.

A method of wireless communication is described. The method may include transmitting, during a random access procedure, precoder selection signals from at least two antennas of the UE and receiving, during the random access procedure, a transmission including a refined precoding setting based at least in part on the transmitted precoder selection signals.

An apparatus for wireless communication is described. The apparatus may include means for transmitting, during a random access procedure, precoder selection signals from at least two antennas of the UE and means for receiving, during the random access procedure, a transmission including a refined precoding setting based at least in part on the transmitted precoder selection signals.

Another apparatus for wireless communication is described. The apparatus may include a processor, memory in electronic communication with the processor, and instructions stored in the memory. The instructions may be operable to cause the processor to transmit, during a random access procedure, precoder selection signals from at least two antennas of the UE and receive, during the random access procedure, a transmission including a refined precoding setting based at least in part on the transmitted precoder selection signals.

A non-transitory computer readable medium for wireless communication is described. The non-transitory computer-readable medium may include instructions operable to cause a processor to transmit, during a random access procedure, precoder selection signals from at least two antennas of the UE and receive, during the random access procedure, a transmission including a refined precoding setting based at least in part on the transmitted precoder selection signals.

In some examples of the method, apparatus, and non-transitory computer-readable medium described above, the transmission comprises at least one of: a RAR grant, DCI scheduling information for an initial PUSCH transmission of the UE, or a combination thereof. In some examples of the method, apparatus, and non-transitory computer-readable medium described above, the same transmission comprises at least one precoder selection signal parameter, the at least one precoder selection signal parameter including: a bandwidth of the precoder selection signals, a cyclic shift of the precoder selection signals, a number of antenna ports from which to transmit the precoder selection signals, or a combination thereof.

Some examples of the method, apparatus, and non-transitory computer-readable medium described above may further include processes, features, means, or instructions for transmitting, during performance of the random access procedure, an initial PUSCH transmission, a retransmission of the initial PUSCH transmission, or a combination thereof including the precoder selection signals, wherein the precoder selection signals may be transmitted with the initial PUSCH transmission and may be based at least in part on at least one precoder selection signal parameter.

In some examples of the method, apparatus, and non-transitory computer-readable medium described above, the refined precoding setting may be based at least in part on: the precoder selection signals, prior-transmitted precoder selection signals transmitted during a prior random access procedure, or a combination thereof.

A method of wireless communication is described. The method may include transmitting, during a random access procedure, precoder selection signals from at least two antennas of the UE, receiving, during the random access procedure, an indication of a refined precoding setting based at least in part on the transmitted precoder selection signals, and receiving system information including a first indication of a first set of resources associated with a single antenna random access procedure and a second indication of a second set of resources associated with multiple antenna random access procedures.

An apparatus for wireless communication is described. The apparatus may include means for transmitting, during a random access procedure, precoder selection signals from at least two antennas of the UE, means for receiving, during the random access procedure, an indication of a refined precoding setting based at least in part on the transmitted precoder selection signals, and means for receiving system information including a first indication of a first set of resources associated with a single antenna random access procedure and a second indication of a second set of resources associated with multiple antenna random access procedures.

Another apparatus for wireless communication is described. The apparatus may include a processor, memory in electronic communication with the processor, and instructions stored in the memory. The instructions may be operable to cause the processor to transmit, during a random access procedure, precoder selection signals from at least two antennas of the UE, receive, during the random access procedure, an indication of a refined precoding setting based at least in part on the transmitted precoder selection signals, and receive system information including a first indication of a first set of resources associated with a single antenna random access procedure and a second indication of a second set of resources associated with multiple antenna random access procedures.

A non-transitory computer readable medium for wireless communication is described. The non-transitory computer-readable medium may include instructions operable to cause a processor to transmit, during a random access procedure, precoder selection signals from at least two antennas of the UE, receive, during the random access procedure, an indication of a refined precoding setting based at least in part on the transmitted precoder selection signals, and receive system information including a first indication of a first set of resources associated with a single antenna random access procedure and a second indication of a second set of resources associated with multiple antenna random access procedures.

Some examples of the method, apparatus, and non-transitory computer-readable medium described above may further include processes, features, means, or instructions for identifying a set of resources associated with multiple antenna random access procedures based at least in part on receiving the system information, wherein the random access procedure comprises transmitting at least one of a PRACH or an ePRACH on the identified set of resources.

Some examples of the method, apparatus, and non-transitory computer-readable medium described above may further include processes, features, means, or instructions for receiving system information including: a first indication that precoder selection signal reception may be enabled, a second indication of a type of precoder selection signal reception that may be enabled, or a combination thereof, wherein the precoder selection signals may be transmitted in response to receiving at least the first indication or the second indication. In some examples of the method, apparatus, and non-transitory computer-readable medium described above, the precoder selection signals may be transmitted with at least one of: a PRACH transmission, or an ePRACH transmission, or an initial PUSCH transmission, or a combination thereof.

A method of wireless communication is described. The method may include transmitting, during a random access procedure, precoder selection signals from at least two antennas of the UE, the precoder selection signals including a first DMRS and a first part of a data transmission transmitted from at least a first antenna of the UE in accordance with a first precoder and a preconfigured precoder cycling and receiving, during the random access procedure, an indication of a refined precoding setting based at least in part on the received precoder selection signals.

An apparatus for wireless communication is described. The apparatus may include means for transmitting, during a random access procedure, precoder selection signals from at least two antennas of the UE, the precoder selection signals including a first DMRS and a first part of a data transmission transmitted from at least a first antenna of the UE in accordance with a first precoder and a preconfigured precoder cycling and means for receiving, during the random access procedure, an indication of a refined precoding setting based at least in part on the received precoder selection signals.

Another apparatus for wireless communication is described. The apparatus may include a processor, memory in electronic communication with the processor, and instructions stored in the memory. The instructions may be operable to cause the processor to transmit, during a random access procedure, precoder selection signals from at least two antennas of the UE, the precoder selection signals including a first DMRS and a first part of a data transmission transmitted from at least a first antenna of the UE in accordance with a first precoder and a preconfigured precoder cycling and receive, during the random access procedure, an indication of a refined precoding setting based at least in part on the received precoder selection signals.

A non-transitory computer readable medium for wireless communication is described. The non-transitory computer-readable medium may include instructions operable to cause a processor to transmit, during a random access procedure, precoder selection signals from at least two antennas of the UE, the precoder selection signals including a first DMRS and a first part of a data transmission transmitted from at least a first antenna of the UE in accordance with a first precoder and a preconfigured precoder cycling and receive, during the random access procedure, an indication of a refined precoding setting based at least in part on the received precoder selection signals.

In some examples of the method, apparatus, and non-transitory computer-readable medium described above, the precoder selection signals further comprise a second DMRS and a second part of the data transmission transmitted from at least a second antenna of the UE, in accordance with a second precoder and the preconfigured precoder cycling, the second precoder being different from the first precoder.

In some examples of the method, apparatus, and non-transitory computer-readable medium described above, transmitting the precoder selection signals comprises: transmitting the first DMRS and the first part of the data transmission from the first antenna of the UE, in accordance with a preconfigured antenna rotation. Some examples of the method, apparatus, and non-transitory computer-readable medium described above may further include processes, features, means, or instructions for transmitting the second DMRS and the second part of the data transmission from the second the UE, in accordance with the preconfigured antenna rotation.

In some examples of the method, apparatus, and non-transitory computer-readable medium described above, the indication of the refined precoding setting may be based at least in part on a first error rate and a second error rate. In some examples of the method, apparatus, and non-transitory computer-readable medium described above, the data transmission comprises a data payload of an ePRACH transmission or an initial PUSCH transmission.

A method for wireless communication at a UE is described. The method may include transmitting precoder selection signals from at least two antennas of the UE during performance of a random access procedure over a wireless network; and receiving, from the wireless network during the random access procedure, an indication of a refined precoding setting for the UE.

In some examples of the method, transmitting the precoder selection signals may include transmitting a first MRS from a first antenna, and transmitting a second MRS from a second antenna. In some examples, the first MRS and the second MRS may be transmitted with at least one of: a PRACH transmission, or an ePRACH transmission, or an initial PUSCH transmission, or a combination thereof. In some examples, the method may include transmitting, during performance of the random access procedure, an ePRACH transmission or an initial PUSCH transmission using a first precoder based at least in part on the indication of the refined precoding setting for the UE, or a second precoder used by the UE during a prior successful random access procedure.

In some examples of the method, transmitting the precoder selection signals may include transmitting a first DMRS and a first part of a data transmission from a first antenna, in accordance with a preconfigured antenna rotation; and transmitting a second DMRS and a second part of the data transmission from a second antenna, in accordance with the preconfigured antenna rotation. In some examples, the data transmission may include a data payload of an ePRACH transmission or an initial PUSCH transmission.

In some examples of the method, transmitting the precoder selection signals may include transmitting a first DMRS and a first part of a data transmission from at least a first antenna and a second antenna using a first precoder, in accordance with a preconfigured precoder cycling; and transmitting a second DMRS and a second part of the data transmission from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission.

In some examples, the method may include applying the refined precoding setting for the UE to at least one transmission in the random access procedure. In some examples, the at least one transmission may include at least one of an initial PUSCH transmission, or a retransmission of the initial PUSCH transmission, or a combination thereof. In some examples, the method may include applying the refined precoding setting for the UE to at least one transmission following the random access procedure.

In some examples, the method may include receiving system information including: a first indication that precoder selection signal reception is enabled, or a second indication of a type of precoder selection signal reception that is enabled, or a combination thereof, and the precoder selection signals may be transmitted in response to receiving at least the first indication or the second indication. In some examples, the method may include receiving, during performance of the random access procedure, a transmission including at least one of: a RAR grant, or DCI scheduling information for an initial PUSCH transmission, or a combination thereof. In some examples, the transmission may include at least one precoder selection signal parameter, and the at least one precoder selection signal parameter may include: a bandwidth of the precoder selection signals, or a cyclic shift of the precoder selection signals, or a number of antenna ports from which to transmit the precoder selection signals, or a combination thereof. In some examples, the method may include transmitting, during performance of the random access procedure, an initial PUSCH; and the precoder selection signals may be transmitted with the initial PUSCH and be based at least in part on the at least one precoder selection signal parameter. In some examples, the indication of the refined precoding setting for the UE may be received in the transmission.

In some examples of the method, the refined precoding setting may be based at least in part on: the precoder selection signals, or prior-transmitted precoder selection signals transmitted during a prior random access procedure performed by the UE, or a combination thereof. In some examples, the method may include identifying a set of resources associated with multiple antenna random access procedures, and performing the random access procedure may include transmitting at least one of a PRACH or an ePRACH on the identified set of resources.

An apparatus for wireless communication at a UE is described. The apparatus may include means for transmitting precoder selection signals from at least two antennas of the UE during performance of a random access procedure over a wireless network; and means for receiving, from the wireless network during the random access procedure, an indication of a refined precoding setting for the UE.

In some examples of the apparatus, the means for transmitting the precoder selection signals may include means for transmitting a first MRS from a first antenna, and means for transmitting a second MRS from a second antenna. In some examples, the first MRS and the second MRS may be transmitted with at least one of: a PRACH transmission, or an ePRACH transmission, or an initial PUSCH transmission, or a combination thereof. In some examples, the apparatus may include means for transmitting, during performance of the random access procedure, an ePRACH transmission or an initial PUSCH transmission using a first precoder based at least in part on the indication of the refined precoding setting for the UE, or a second precoder used by the UE during a prior successful random access procedure.

In some examples of the apparatus, the means for transmitting the precoder selection signals may include means for transmitting a DMRS and a first part of a data transmission from a first antenna, in accordance with a preconfigured antenna rotation; and means for transmitting a second DMRS and a second part of the data transmission from a second antenna, in accordance with the preconfigured antenna rotation. In some examples, the data transmission may include a data payload of an ePRACH transmission or an initial PUSCH transmission.

In some examples of the apparatus, the means for transmitting the precoder selection signals may include transmitting a first DMRS and a first part of a data transmission from at least a first antenna and a second antenna using a first precoder, in accordance with a preconfigured precoder cycling; and means for transmitting a second DMRS and a second part of the data transmission from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission.

In some examples, the apparatus may include means for applying the refined precoding setting for the UE to at least one transmission in the random access procedure. In some examples, the at least one transmission may include at least one of an initial PUSCH transmission, or a retransmission of the initial PUSCH transmission, or a combination thereof. In some examples, the apparatus may include applying the refined precoding setting for the UE to at least one transmission following the random access procedure.

In some examples, the apparatus may include means for receiving system information including: a first indication that precoder selection signal reception is enabled, or a second indication of a type of precoder selection signal reception that is enabled, or a combination thereof, and the precoder selection signals may be transmitted in response to receiving at least the first indication or the second indication. In some examples, the apparatus may include means for receiving, during performance of the random access procedure, a transmission including at least one of: a RAR grant, or DCI scheduling information for an initial PUSCH transmission, or a combination thereof. In some examples, the transmission may include at least one precoder selection signal parameter, and the at least one precoder selection signal parameter may include: a bandwidth of the precoder selection signals, or a cyclic shift of the precoder selection signals, or a number of antenna ports from which to transmit the precoder selection signals, or a combination thereof. In some examples, the apparatus may include means for transmitting, during performance of the random access procedure, an initial PUSCH; and the precoder selection signals may be transmitted with the initial PUSCH and be based at least in part on the at least one precoder selection signal parameter. In some examples, the indication of the refined precoding setting for the UE may be received in the transmission.

In some examples of the apparatus, the refined precoding setting may be based at least in part on: the precoder selection signals, or prior-transmitted precoder selection signals transmitted during a prior random access procedure performed by the UE, or a combination thereof. In some examples, the apparatus may include means for identifying a set of resources associated with multiple antenna random access procedures, and performing the random access procedure may include transmitting at least one of a PRACH or an ePRACH on the identified set of resources.

Another apparatus for wireless communication at a UE is described. The apparatus may include a processor, memory in electronic communication with the processor, and instructions stored in the memory. The instructions may be executable by the processor to transmit precoder selection signals from at least two antennas of the UE during performance of a random access procedure over a wireless network; and to receive, from the wireless network during the random access procedure, an indication of a refined precoding setting for the UE.

In some examples of the apparatus, the instructions executable by the processor to transmit the precoder selection signals may include instructions executable by the processor to transmit a first MRS from a first antenna, and to transmit a second MRS from a second antenna. In some examples, the first MRS and the second MRS may be transmitted with at least one of: a PRACH transmission, or an ePRACH transmission, or an initial PUSCH transmission, or a combination thereof. In some examples, the apparatus may include instructions executable by the processor to transmit, during performance of the random access procedure, an ePRACH transmission or an initial PUSCH transmission using a first precoder based at least in part on the indication of the refined precoding setting for the UE, or a second precoder used by the UE during a prior successful random access procedure.

In some examples of the apparatus, the instructions executable by the processor to transmit the precoder selection signals may include instructions executable by the processor to transmit a first DMRS and a first part of a data transmission from a first antenna, in accordance with a preconfigured antenna rotation; and to transmit a second DMRS and a second part of the data transmission from a second antenna, in accordance with the preconfigured antenna rotation. In some examples, the data transmission may include a data payload of an ePRACH transmission or an initial PUSCH transmission.

In some examples of the apparatus, the instructions executable by the processor to transmit the precoder selection signals may include instructions executable by the processor to transmit a first DMRS and a first part of a data transmission from at least a first antenna and a second antenna using a first precoder, in accordance with a preconfigured precoder cycling; and to transmit a second DMRS and a second part of the data transmission from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission.

In some examples, the apparatus may include instructions executable by the processor to apply the refined precoding setting for the UE to at least one transmission in the random access procedure. In some examples, the at least one transmission may include at least one of an initial PUSCH transmission, or a retransmission of the initial PUSCH transmission, or a combination thereof. In some examples, the apparatus may include instructions executable by the processor to apply the refined precoding setting for the UE to at least one transmission following the random access procedure.

In some examples, the apparatus may include instructions executable by the processor to receive system information including: a first indication that precoder selection signal reception is enabled, or a second indication of a type of precoder selection signal reception that is enabled, or a combination thereof, and the precoder selection signals may be transmitted in response to receiving at least the first indication or the second indication. In some examples, the apparatus may include instructions executable by the processor to receive, during performance of the random access procedure, a transmission including at least one of: a RAR grant, or DCI scheduling information for an initial PUSCH transmission, or a combination thereof. In some examples, the transmission may include at least one precoder selection signal parameter, and the at least one precoder selection signal parameter may include: a bandwidth of the precoder selection signals, or a cyclic shift of the precoder selection signals, or a number of antenna ports from which to transmit the precoder selection signals, or a combination thereof. In some examples, the apparatus may include instructions executable by the processor to transmit, during performance of the random access procedure, an initial PUSCH; and the precoder selection signals may be transmitted with the initial PUSCH and be based at least in part on the at least one precoder selection signal parameter. In some examples, the indication of the refined precoding setting for the UE may be received in the transmission.

In some examples of the apparatus, the refined precoding setting may be based at least in part on: the precoder selection signals, or prior-transmitted precoder selection signals transmitted during a prior random access procedure performed by the UE, or a combination thereof. In some examples, the apparatus may include instructions executable by the processor to identify a set of resources associated with multiple antenna random access procedures, and performing the random access procedure may include transmitting at least one of a PRACH or an ePRACH on the identified set of resources.

A non-transitory computer-readable medium storing computer-executable code for wireless communication at a UE is described. The code may be executable by a processor to transmit precoder selection signals from at least two antennas of the UE during performance of a random access procedure over a wireless network; and to receive, from the wireless network during the random access procedure, an indication of a refined precoding setting for the UE.

In some examples of the non-transitory computer-readable medium, the code executable by the processor to transmit the precoder selection signals may include code executable by the processor to transmit a first MRS from a first antenna, and to transmit a second MRS from a second antenna. In some examples, the first MRS and the second MRS may be transmitted with at least one of: a PRACH transmission, or an ePRACH transmission, or an initial PUSCH transmission, or a combination thereof. In some examples, the non-transitory computer-readable medium may include code executable by the processor to transmit, during performance of the random access procedure, an ePRACH transmission or an initial PUSCH transmission using a first precoder based at least in part on the indication of the refined precoding setting for the UE, or a second precoder used by the UE during a prior successful random access procedure.

In some examples of the non-transitory computer-readable medium, the code executable by the processor to transmit the precoder selection signals may include code executable by the processor to transmit a first DMRS and a first part of a data transmission from a first antenna, in accordance with a preconfigured antenna rotation; and to transmit a second DMRS and a second part of the data transmission from a second antenna, in accordance with the preconfigured antenna rotation. In some examples, the data transmission may include a data payload of an ePRACH transmission or an initial PUSCH transmission.

In some examples of the non-transitory computer-readable medium, the code executable by the processor to transmit the precoder selection signals may include code executable by the processor to transmit a first DMRS and a first part of a data transmission from at least a first antenna and a second antenna using a first precoder, in accordance with a preconfigured precoder cycling; and to transmit a second DMRS and a second part of the data transmission from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission.

In some examples, the non-transitory computer-readable medium may include code executable by the processor to apply the refined precoding setting for the UE to at least one transmission in the random access procedure. In some examples, the at least one transmission may include at least one of an initial PUSCH transmission, or a retransmission of the initial PUSCH transmission, or a combination thereof. In some examples, the non-transitory computer-readable medium may include code executable by the processor to apply the refined precoding setting for the UE to at least one transmission following the random access procedure.

In some examples, the non-transitory computer-readable medium may include code executable by the processor to receive system information including: a first indication that precoder selection signal reception is enabled, or a second indication of a type of precoder selection signal reception that is enabled, or a combination thereof, and the precoder selection signals may be transmitted in response to receiving at least the first indication or the second indication. In some examples, the non-transitory computer-readable medium may include code executable by the processor to receive, during performance of the random access procedure, a transmission including at least one of: a RAR grant, or DCI scheduling information for an initial PUSCH transmission, or a combination thereof. In some examples, the transmission may include at least one precoder selection signal parameter, and the at least one precoder selection signal parameter may include: a bandwidth of the precoder selection signals, or a cyclic shift of the precoder selection signals, or a number of antenna ports from which to transmit the precoder selection signals, or a combination thereof. In some examples, the non-transitory computer-readable medium may include code executable by the processor to transmit, during performance of the random access procedure, an initial PUSCH; and the precoder selection signals may be transmitted with the initial PUSCH and be based at least in part on the at least one precoder selection signal parameter. In some examples, the indication of the refined precoding setting for the UE may be received in the transmission.

In some examples of the non-transitory computer-readable medium, the refined precoding setting may be based at least in part on: the precoder selection signals, or prior-transmitted precoder selection signals transmitted during a prior random access procedure performed by the UE, or a combination thereof. In some examples, the non-transitory computer-readable medium may include code executable by the processor to identify a set of resources associated with multiple antenna random access procedures, and performing the random access procedure may include transmitting at least one of a PRACH or an ePRACH on the identified set of resources.

A method for wireless communication at a network access device is described. The method may include receiving, from a UE during a random access procedure performed by the UE, precoder selection signals from at least two antennas of the UE; identifying a refined precoding setting for the UE based at least in part on the received precoder selection signals; and transmitting an indication of the refined precoding setting to the UE.

In some examples of the method, receiving the precoder selection signals may include receiving a first MRS from a first antenna of the UE, and receiving a second MRS from a second antenna of the UE. In some examples, the first MRS and the second MRS may be received with at least one of: a PRACH transmission, or an ePRACH transmission, or an initial PUSCH transmission, or a combination thereof.

In some examples of the method, receiving the precoder selection signals may include receiving a first DMRS and a first part of a data transmission from a first antenna of the UE, in accordance with a preconfigured antenna rotation; and receiving a second DMRS and a second part of the data transmission from a second antenna of the UE, in accordance with the preconfigured antenna rotation. In some examples, the data transmission may include a data payload of an ePRACH transmission or an initial PUSCH transmission. In some examples, the method may include determining a first error rate associated with the first part of the data transmission, and determining a second error rate associated with the second part of the data transmission, and the refined precoding setting for the UE may be identified based at least in part on the first error rate and the second error rate.

In some examples of the method, receiving the precoder selection signals may include receiving a first DMRS and a first part of a data transmission from at least a first antenna and a second antenna of the UE, in accordance with a first precoder and a preconfigured precoder cycling; and receiving a second DMRS and a second part of the data transmission from at least the first antenna and the second antenna of the UE, in accordance with a second precoder and the preconfigured precoder cycling. The second precoder may be different from the first precoder. In some examples, the data transmission may include a data payload of an ePRACH transmission or an initial PUSCH transmission. In some examples, the method may include determining a first error rate associated with the first part of the data transmission, and determining a second error rate associated with the second part of the data transmission, and the refined precoding setting for the UE may be identified based at least in part on the first error rate and the second error rate.

In some examples, the method may include receiving at least one transmission from the UE in accordance with the indicated refined precoding setting. The at least one transmission may include: an initial PUSCH transmission, or a retransmission of the initial PUSCH transmission, or a combination thereof. In some examples, the method may include transmitting system information including: a first indication that precoder selection signal reception is enabled, or a second indication of a type of precoder selection signal reception that is enabled, or a combination thereof, and the precoder selection signals may be received in response to transmitting at least the first indication or the second indication.

In some examples, the method may include transmitting, during performance of the random access procedure, a transmission including at least one of: a RAR grant, or DCI scheduling information for an initial PUSCH transmission of the UE, or a combination thereof. In some examples, the transmission may include at least one precoder selection signal parameter. The at least one precoder selection signal parameter may include: a bandwidth of the precoder selection signals, or a cyclic shift of the precoder selection signals, or a number of antenna ports from which to transmit the precoder selection signals, or a combination thereof. In some examples, the indication of the refined precoding setting may be included in the transmission. In some examples, the method may include transmitting system information including a first indication of a first set of resources associated with single antenna random access procedures, and a second indication of a second set of resources associated with multiple antenna random access procedures.

An apparatus for wireless communication at a network access device is described. The apparatus may include means for receiving, from a UE during a random access procedure performed by the UE, precoder selection signals from at least two antennas of the UE; means for identifying a refined precoding setting for the UE based at least in part on the received precoder selection signals; and means for transmitting an indication of the refined precoding setting to the UE.

In some examples of the apparatus, the means for receiving the precoder selection signals may include means for receiving a first MRS from a first antenna of the UE, and means for receiving a second MRS from a second antenna of the UE. In some examples, the first MRS and the second MRS may be received with at least one of: a PRACH transmission, or an ePRACH transmission, or an initial PUSCH transmission, or a combination thereof.

In some examples of the apparatus, the means for receiving the precoder selection signals may include means for receiving a first DMRS and a first part of a data transmission from a first antenna of the UE, in accordance with a preconfigured antenna rotation; and means for receiving a second DMRS and a second part of the data transmission from a second antenna of the UE, in accordance with the preconfigured antenna rotation. In some examples, the data transmission may include a data payload of an ePRACH transmission or an initial PUSCH transmission. In some examples, the apparatus may include means for determining a first error rate associated with the first part of the data transmission, and means for determining a second error rate associated with the second part of the data transmission, and the refined precoding setting for the UE may be identified based at least in part on the first error rate and the second error rate.

In some examples of the apparatus, the means for receiving the precoder selection signals may include means for receiving a first DMRS and a first part of a data transmission from at least a first antenna and a second antenna of the UE, in accordance with a first precoder and a preconfigured precoder cycling; and means for receiving a second DMRS and a second part of the data transmission from at least the first antenna and the second antenna of the UE, in accordance with a second precoder and the preconfigured precoder cycling. The second precoder may be different from the first precoder. In some examples, the data transmission may include a data payload of an ePRACH transmission or an initial PUSCH transmission. In some examples, the apparatus may include means for determining a first error rate associated with the first part of the data transmission, and means for determining a second error rate associated with the second part of the data transmission, and the refined precoding setting for the UE may be identified based at least in part on the first error rate and the second error rate.

In some examples, the apparatus may include means for receiving at least one transmission from the UE in accordance with the indicated refined precoding setting. The at least one transmission may include: an initial PUSCH transmission, or a retransmission of the initial PUSCH transmission, or a combination thereof. In some examples, the apparatus may include means for transmitting system information including: a first indication that precoder selection signal reception is enabled, or a second indication of a type of precoder selection signal reception that is enabled, or a combination thereof, and the precoder selection signals may be received in response to transmitting at least the first indication or the second indication.

In some examples, the apparatus may include means for transmitting, during performance of the random access procedure, a transmission including at least one of: a RAR grant, or DCI scheduling information for an initial PUSCH transmission of the UE, or a combination thereof. In some examples, the transmission may include at least one precoder selection signal parameter. The at least one precoder selection signal parameter may include: a bandwidth of the precoder selection signals, or a cyclic shift of the precoder selection signals, or a number of antenna ports from which to transmit the precoder selection signals, or a combination thereof. In some examples, the indication of the refined precoding setting may be included in the transmission. In some examples, the apparatus may include means for transmitting system information including a first indication of a first set of resources associated with single antenna random access procedures, and a second indication of a second set of resources associated with multiple antenna random access procedures.

Another apparatus for wireless communication at a UE is described. The apparatus may include a processor, memory in electronic communication with the processor, and instructions stored in the memory. The instructions may be executable by the processor to receive, from a UE during a random access procedure performed by the UE, precoder selection signals from at least two antennas of the UE; to identify a refined precoding setting for the UE based at least in part on the received precoder selection signals; and to transmit an indication of the refined precoding setting to the UE.

In some examples of the apparatus, the instructions executable by the processor to receive the precoder selection signals may include instructions executable by the processor to receive a first MRS from a first antenna of the UE, and to receive a second MRS from a second antenna of the UE. In some examples, the first MRS and the second MRS may be received with at least one of: a PRACH transmission, or an ePRACH transmission, or an initial PUSCH transmission, or a combination thereof.

In some examples of the apparatus, the instructions executable by the processor to receive the precoder selection signals may include instructions executable by the processor to receive a first DMRS and a first part of a data transmission from a first antenna of the UE, in accordance with a preconfigured antenna rotation; and to receive a second DMRS and a second part of the data transmission from a second antenna of the UE, in accordance with the preconfigured antenna rotation. In some examples, the data transmission may include a data payload of an ePRACH transmission or an initial PUSCH transmission. In some examples, the apparatus may include instructions executable by the processor to determine a first error rate associated with the first part of the data transmission, and to determine a second error rate associated with the second part of the data transmission, and the refined precoding setting for the UE may be identified based at least in part on the first error rate and the second error rate.

In some examples of the apparatus, the instructions executable by the processor to receive the precoder selection signals may include instructions executable by the processor to receive a first DMRS and a first part of a data transmission from at least a first antenna and a second antenna of the UE, in accordance with a first precoder and a preconfigured precoder cycling; and to receive a second DMRS and a second part of the data transmission from at least the first antenna and the second antenna of the UE, in accordance with a second precoder and the preconfigured precoder cycling. The second precoder may be different from the first precoder. In some examples, the data transmission may include a data payload of an ePRACH transmission or an initial PUSCH transmission. In some examples, the apparatus may include instructions executable by the processor to determine a first error rate associated with the first part of the data transmission, and to determine a second error rate associated with the second part of the data transmission, and the refined precoding setting for the UE may be identified based at least in part on the first error rate and the second error rate.

In some examples, the apparatus may include instructions executable by the processor to receive at least one transmission from the UE in accordance with the indicated refined precoding setting. The at least one transmission may include: an initial PUSCH transmission, or a retransmission of the initial PUSCH transmission, or a combination thereof. In some examples, the apparatus may include means for transmitting system information including: a first indication that precoder selection signal reception is enabled, or a second indication of a type of precoder selection signal reception that is enabled, or a combination thereof, and the precoder selection signals may be received in response to transmitting at least the first indication or the second indication.

In some examples, the apparatus may include instructions executable by the processor to transmit, during performance of the random access procedure, a transmission including at least one of: a RAR grant, or DCI scheduling information for an initial PUSCH transmission of the UE, or a combination thereof. In some examples, the transmission may include at least one precoder selection signal parameter. The at least one precoder selection signal parameter may include: a bandwidth of the precoder selection signals, or a cyclic shift of the precoder selection signals, or a number of antenna ports from which to transmit the precoder selection signals, or a combination thereof. In some examples, the indication of the refined precoding setting may be included in the transmission. In some examples, the apparatus may include instructions executable by the processor to transmit system information including a first indication of a first set of resources associated with single antenna random access procedures, and a second indication of a second set of resources associated with multiple antenna random access procedures.

A non-transitory computer-readable medium storing computer-executable code for wireless communication at a UE is described. The code may be executable by a processor to receive, from a UE during a random access procedure performed by the UE, precoder selection signals from at least two antennas of the UE; to identify a refined precoding setting for the UE based at least in part on the received precoder selection signals; and to transmit an indication of the refined precoding setting to the UE.

In some examples of the non-transitory computer-readable medium, the code executable by the processor to receive the precoder selection signals may include code executable by the processor to receive a first MRS from a first antenna of the UE, and to receive a second MRS from a second antenna of the UE. In some examples, the first MRS and the second MRS may be received with at least one of: a PRACH transmission, or an ePRACH transmission, or an initial PUSCH transmission, or a combination thereof.

In some examples of the non-transitory computer-readable medium, the code executable by the processor to receive the precoder selection signals may include code executable by the processor to receive a first DMRS and a first part of a data transmission from a first antenna of the UE, in accordance with a preconfigured antenna rotation; and to receive a second DMRS and a second part of the data transmission from a second antenna of the UE, in accordance with the preconfigured antenna rotation. In some examples, the data transmission may include a data payload of an ePRACH transmission or an initial PUSCH transmission. In some examples, the non-transitory computer-readable medium may include code executable by the processor to determine a first error rate associated with the first part of the data transmission, and to determine a second error rate associated with the second part of the data transmission, and the refined precoding setting for the UE may be identified based at least in part on the first error rate and the second error rate.

In some examples of the non-transitory computer-readable medium, the code executable by the processor to receive the precoder selection signals may include code executable by the processor to receive a first DMRS and a first part of a data transmission from at least a first antenna and a second antenna of the UE, in accordance with a first precoder and a preconfigured precoder cycling; and to receive a second DMRS and a second part of the data transmission from at least the first antenna and the second antenna of the UE, in accordance with a second precoder and the preconfigured precoder cycling. The second precoder may be different from the first precoder. In some examples, the data transmission may include a data payload of an ePRACH transmission or an initial PUSCH transmission. In some examples, the non-transitory computer-readable medium may include code executable by the processor to determine a first error rate associated with the first part of the data transmission, and to determine a second error rate associated with the second part of the data transmission, and the refined precoding setting for the UE may be identified based at least in part on the first error rate and the second error rate.

In some examples, the non-transitory computer-readable medium may include code executable by the processor to receive at least one transmission from the UE in accordance with the indicated refined precoding setting. The at least one transmission may include: an initial PUSCH transmission, or a retransmission of the initial PUSCH transmission, or a combination thereof. In some examples, the non-transitory computer-readable medium may include means for transmitting system information including: a first indication that precoder selection signal reception is enabled, or a second indication of a type of precoder selection signal reception that is enabled, or a combination thereof, and the precoder selection signals may be received in response to transmitting at least the first indication or the second indication.

In some examples, the non-transitory computer-readable medium may include code executable by the processor to transmit, during performance of the random access procedure, a transmission including at least one of: a RAR grant, or DCI scheduling information for an initial PUSCH transmission of the UE, or a combination thereof. In some examples, the transmission may include at least one precoder selection signal parameter. The at least one precoder selection signal parameter may include: a bandwidth of the precoder selection signals, or a cyclic shift of the precoder selection signals, or a number of antenna ports from which to transmit the precoder selection signals, or a combination thereof. In some examples, the indication of the refined precoding setting may be included in the transmission. In some examples, the non-transitory computer-readable medium may include code executable by the processor to transmit system information including a first indication of a first set of resources associated with single antenna random access procedures, and a second indication of a second set of resources associated with multiple antenna random access procedures.

The foregoing has outlined rather broadly the techniques and technical advantages of examples according to the disclosure in order that the detailed description that follows may be better understood. Additional techniques and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or functions may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
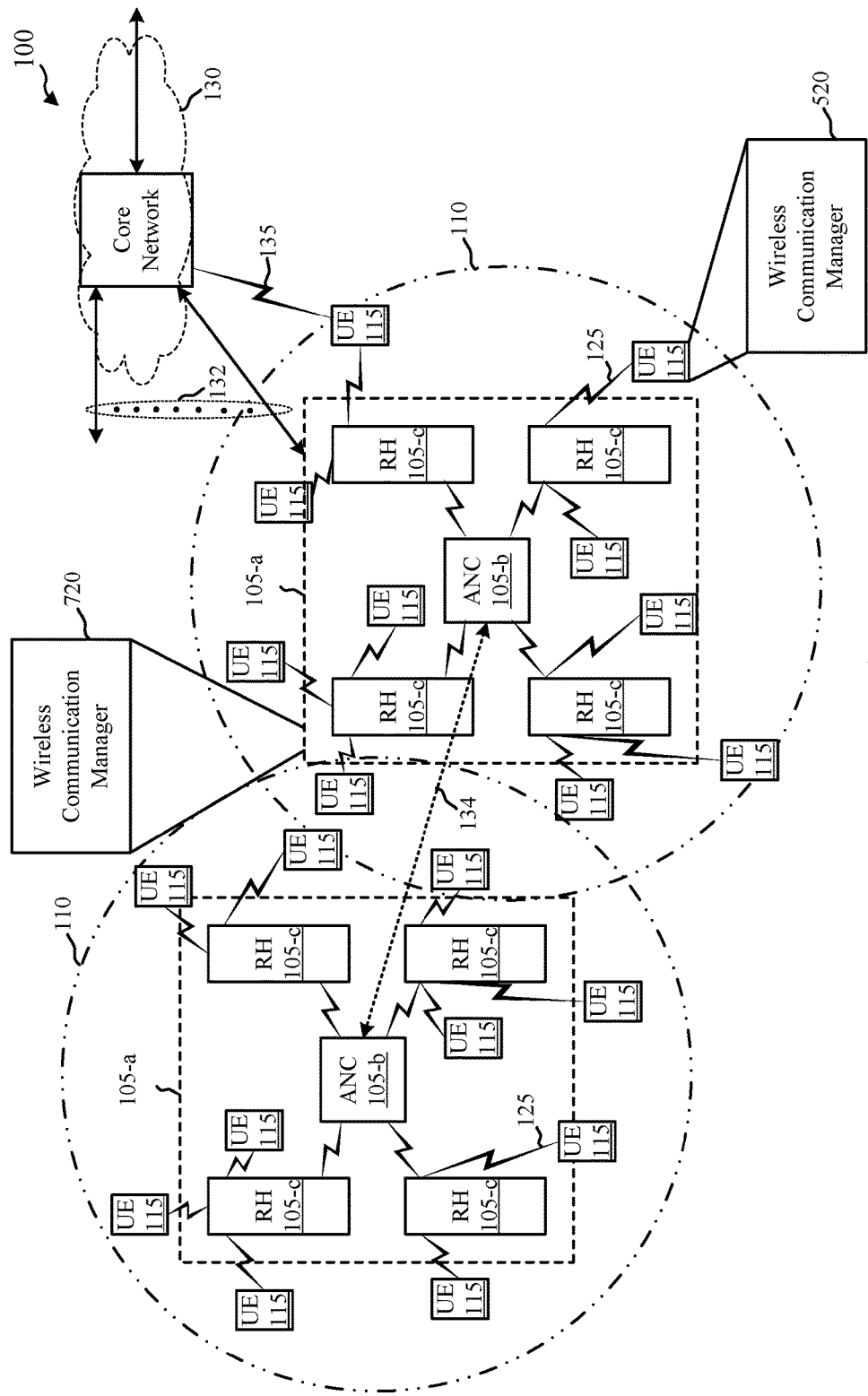
FIG. 1 shows an example of a wireless communication system, in accordance with one or more aspects of the present disclosure.

Techniques are described in which precoding is managed for a UE that is capable of using two or more antennas to transmit during a random access procedure. When a UE is capable of transmitting using two or more antennas, transmissions made by the UE may be precoded by phase-shifting and/or power controlling information streams transmitted from the two or more antennas. Precoding can improve the ability of an intended receiver (e.g., a network access device) to receive and decode a transmission.

When a UE makes a first transmission in accordance with performing a random access procedure, the UE may make the transmission without using precoding, using a precoder used for a past transmission (e.g., a last successful random access procedure), or using a precoder based on a primary synchronization signal (PSS), a secondary synchronization signal (SSS), etc. The precoder used by the UE for the first transmission in accordance with performing the random access procedure may or may not be well-suited for transmitting to a particular network access device during the random access procedure (or for transmitting to the network access device on a particular channel during the random access procedure).

In accordance with techniques described in the present disclosure, a UE may transmit precoder selection signals with a first transmission (or any transmission) of a random access procedure. The precoder selection signals may be transmitted from at least two antennas of the UE, and may enable a network access device that receives the precoder selection signals to identify a refined precoding setting for the UE. For example, in some cases the precoder selection signals may include a first MRS transmitted from a first antenna of the UE and a second MRS transmitted from a second antenna of the UE. The first MRS may function to "sound" the first antenna, and the second MRS may function to sound the second antenna, so that a network access device may determine a refined precoding setting for the UE (e.g., a delta in one or more precoding settings used to make a transmission associated with the first MRS and second MRS).

In other cases, the precoder selection signals may include a first DMRS and a first part of a data transmission transmitted from a first antenna of a UE in accordance with a preconfigured antenna rotation, and a second DMRS and a second part of the data transmission transmitted from a second antenna of the UE in accordance with the preconfigured antenna rotation. That is, different parts of the data transmission may be transmitted using different antennas, in accordance with a preconfigured antenna rotation, so that a network access device that receives the data transmission may determine how the antennas might be used to define a refined precoding for the UE.

In other examples, the precoder selection signals may include a first DMRS and a first part of a data transmission transmitted from at least a first antenna and a second antenna of a UE using a first precoder, in accordance with a preconfigured precoder cycling, and a second part of the data transmission transmitted from at least the first antenna and the second antenna of the UE using a second precoder, in accordance with the preconfigured precoder cycling. That is, different parts of the data transmission may be transmitted using different precoders, in accordance with a preconfigured precoder cycling, so that a network access device that receives the data transmission may determine which of the precoders (or another precoder) might be a best precoder for the UE.

Upon receiving a refined precoding setting, a UE may apply the refined precoding setting to a subsequent transmission made in accordance with the same random access procedure, or to a transmission made following the current random access procedure (and in some cases, to a transmission of a subsequent random access procedure performed by the UE).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

FIG. 1 shows an example of a wireless communication system 100, in accordance with one or more aspects of the disclosure. The wireless communication system 100 may include network access devices 105 (e.g., eNBs 105-$a$, gNBs 105-$a$, ANCs 105-$b$, NR gNodeBs (gNBs), NR Node-Bs, an NR access node, and/or RHs 105-$c$), UEs 115, and a core network 130. The core network 130 may provide user authentication, access authorization, tracking, Internet Protocol (IP) connectivity, and other access, routing, or mobility functions. At least some of the network access devices 105 (e.g., eNBs 105-$a$, gNBs 105-$a$, or ANCs 105-$b$) may interface with the core network 130 through backhaul links 132 (e.g., S1, S2, etc.) and may perform radio configuration and scheduling for communication with the UEs 115. In various examples, the ANCs 105-$b$ may communicate, either directly or indirectly (e.g., through core network 130), with each other over backhaul links 134 (e.g., X1, X2, etc.), which may be wired or wireless communication links. Each ANC 105-$b$ may also communicate with a number of UEs 115 through a number of smart radio heads (e.g., RHs 105-$c$). In an alternative configuration of the wireless communication system 100, the functionality of an ANC 105-$b$ may be provided by a radio head 105-$c$ or distributed across the radio heads 105-$c$ of an eNB or gNB 105-$a$. In another alternative configuration of the wireless communication system 100 (e.g., an LTE/LTE-A configuration), the radio heads 105-$c$ may be replaced with base stations, and the ANCs 105-$b$ may be replaced by base station controllers (or links to the core network 130). In some examples, the wireless communication system 100 may include a mix of radio heads 105-$c$, base stations, and/or other network access devices 105 for receiving/transmitting communications according to different radio access technologies (RATs) (e.g., LTE/LTE-A, 5G, Wi-Fi, etc.).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A femto cell also may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers). A gNB for a macro cell may be referred to as a macro gNB. A gNB for a small cell may be referred to as a small cell gNB, a pico gNB, a femto gNB, or a home gNB. A gNB may support one or multiple (e.g., two, three, four, and the like) cells (e.g., component carriers).

The wireless communication system 100 may support synchronous or asynchronous operation. For synchronous operation, the eNBs or gNBs 105-$a$ and/or radio heads 105-$c$ may have similar frame timing, and transmissions from different eNBs or gNBs 105-$a$ and/or radio heads 105-$c$ may be approximately aligned in time. For asynchronous operation, the eNBs or gNBs 105-$a$ and/or radio heads 105-$c$ may have different frame timings, and transmissions from different eNBs or gNBs 105-$a$ and/or radio heads 105-$c$ may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a radio head 105-$c$, ANC 105-$b$, or core network 130 supporting radio bearers for user plane data. At the Physical (PHY) layer, transport channels may be mapped to physical channels.

A UE 115 may communicate with the core network 130 through communication link 135. The UEs 115 may be dispersed throughout the wireless communication system 100, and each UE 115 may be stationary or mobile. A UE 115 may also include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, an Internet of Everything (IoE) device, etc. A UE 115 may be able to communicate with various types of eNBs or gNBs 105-$a$, radio heads 105-$c$, base stations, access points, or other network access devices, including macro eNBs, small cell eNBs, relay base stations, and the like. A UE 115 may also be able to communicate directly with other UEs 115 (e.g., using a peer-to-peer (P2P) protocol).

The communication links 125 shown in wireless communication system 100 may include uplinks (ULs) from a UE 115 to a radio head 105-c, and/or downlinks (DLs), from a radio head 105-c to a UE 115. The downlinks may also be called forward links, while the uplinks may also be called reverse links. Control information and data may be multiplexed on an uplink or downlink according to various techniques. Control information and data may be multiplexed on an uplink or downlink, for example, using time-division multiplexing (TDM) techniques, frequency-division multiplexing (FDM) techniques, or hybrid TDM-FDM techniques.

Each communication link 125 may include one or more carriers, where each carrier may be a signal made up of multiple sub-carriers (e.g., waveform signals of different frequencies) modulated according to one or more radio access technologies. Each modulated signal may be sent on a different sub-carrier and may carry control information (e.g., reference signals, control channels, etc.), overhead information, user data, etc. The communication links 125 may transmit bidirectional communications using Frequency Division Duplexing (FDD) techniques (e.g., using paired spectrum resources) or Time Division Duplexing (TDD) techniques (e.g., using unpaired spectrum resources). Frame structures for FDD (e.g., frame structure type 1) and TDD (e.g., frame structure type 2) may be defined.

In some examples of the wireless communication system 100, network access devices 105 (e.g., radio heads 105-c) and UEs 115 may include multiple antennas for employing antenna diversity schemes to improve communication quality and reliability between network access devices 105 and UEs 115. Additionally or alternatively, network access devices and UEs 115 may employ multiple-input, multiple-output (MIMO) techniques that may take advantage of multi-path environments to transmit multiple spatial layers carrying the same or different coded data. In some cases, signal processing techniques such as beamforming (i.e., directional transmission) may be used with MIMO techniques to coherently combine signal energies and overcome the path loss in specific beam directions. Precoding (e.g., weighting transmissions on different paths or layers, or from different antennas) may be used in conjunction with MIMO or beamforming techniques.

The wireless communication system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and TDD component carriers.

At times, a UE 115 may perform a random access procedure with a network access device 105. A UE 115 may perform a random access procedure with a network access device 105, for example, when initially accessing a wireless network from an idle state (e.g., when performing initial access from an RRC_IDLE state), or when performing an RRC Connection Re-establishment procedure, or in conjunction with a handover procedure. The performance of a random access procedure when initially accessing a wireless network from an idle state is a common type of random access procedure. A UE 115 may also perform a random access procedure with a network access device 105 upon downlink data arrival when in an RRC_CONNECTED state (e.g., when UL synchronization is "non-synchronized"), or upon uplink data arrival when in an RRC_CONNECTED state (e.g., when UL synchronization is "non-synchronized," or when no physical uplink control channel (PUCCH) resources are available for transmitting a scheduling request (SR)). A UE 115 may also perform a random access procedure with a network access device 105 for a positioning purpose when in an RRC_CONNECTED state (e.g., when a timing advance is needed for UE positioning). In some examples, a UE 115 may perform a random access procedure with a network access device 105 in a CA or dual-connectivity scenario.

Random access procedures may be contention-based or non-contention-based. Contention-based random access procedures may include random access procedures performed when initially accessing a wireless network from an idle state. Non-contention-based random access procedures include, for example, random access procedures performed in conjunction with a handover procedure. Techniques described in the present disclosure pertain to a contention-based random access procedure.

In some examples, a UE 115 may include a wireless communication manager 520. The wireless communication manager 520 may be used to transmit precoder selection signals from at least two antennas of the UE 115 during performance of a random access procedure over a wireless network (e.g., a random access procedure performed with one of the network access devices 105). The wireless communication manager 520 may also be used to receive, from the wireless network during the random access procedure (e.g., from one of the network access devices 105), an indication of a refined precoding setting for the UE 115.

In some examples, a network access device 105 may include a wireless communication manager 720. The wireless communication manager 720 may be used to receive, from a UE 115 during a random access procedure performed by the UE 115, precoder selection signals from at least two antennas of the UE 115. The wireless communication manager 720 may also be used to identify a refined precoding setting for the UE 115 based at least in part on the received precoder selection signals, and to transmit an indication of the refined precoding setting to the UE 115.

Figure 2:
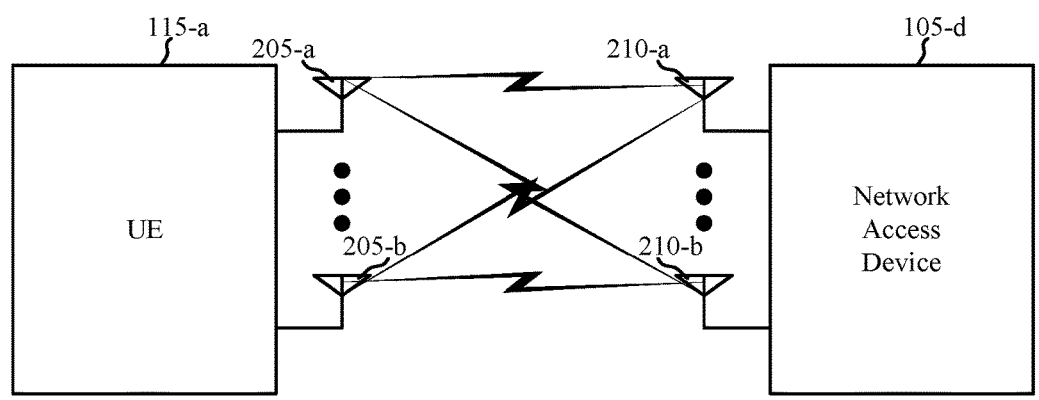
FIG. 2 shows an example of a wireless communication system, in accordance with one or more aspects of the present disclosure.

FIG. 2 shows an example of a wireless communication system 200, in accordance with one or more aspects of the present disclosure. The wireless communication system 200 may include a UE 115-a and a network access device 105-d. The UE 115-a and network access device 105-d may be examples of aspects of the UEs 115 and network access devices 105 as described with reference to FIG. 1.

Each of the UE 115-a and the network access device 105-d may include a number of antennas (e.g., one or more antennas). By way of example, the UE 115-a is shown to have at least a first antenna 205-a and a second antenna 205-b, and the network access device 105-d is shown to have at least a first antenna 210-a and a second antenna 210-b.

In some examples, the UE 115-a or the network access device 105-d may use two or more of its antennas (i.e., a plurality of antennas) to beamform a transmission to the other device. For example, the UE 115-a may use a plurality of its antennas 205 to beamform an uplink transmission to the network access device 105-d. Similarly, the network access device 105-d may use a plurality of its antennas to beamform a downlink transmission to the UE 115-a. A beamformed transmission may include a plurality of transmissions from different antennas, which transmissions are phase-shifted and/or power controlled, in accordance with a precoder, to constructively and destructively interfere to produce a directional transmission. The use of beamforming by the UE 115-a or the network access device 105-d may be more likely when transmitting at high carrier frequencies (e.g., at millimeter wave frequencies). Beam-based operation may be associated with UE-common procedures (e.g., initial access) or UE-specific procedures (e.g., unicast transmissions).

Some beam-based operations may be open loop. For example, PSS transmissions, SSS transmissions, or physical broadcast channel (PBCH) transmissions may be open loop. The beams used for these transmissions may be transparent to the UE 115-d and may be subject to change. Other beam-based operations may be closed loop (e.g., based on UE-specific feedback that enables the network access device 105-d to determine a best set of beams for UE-specific or UE group-specific operation).

In some examples, the UE 115-a may perform a random access procedure with a wireless network including the network access device 105-d. In some examples, the random access procedure may be a four-operation random access procedure, as described with reference to FIG. 3. In some examples, the random access procedure may be a two-operation random access procedure, as described with reference to FIG. 4. In some examples, a message transmitted as part of a random access procedure may be precoded (e.g., using analog precoding or digital precoding) according to a precoding setting. In some examples, the UE 115-a may derive analog precoding for transmitting a first message of a random access procedure (e.g., in a PRACH transmission or an ePRACH transmission) based at least in part on PSS/SSS transmissions received from the network access device 105-d. In some examples, the network access device 105-d may refine the precoding setting based at least in part on a precoding sweeping operation. That is, a further precoding setting (e.g., a secondary precoding setting, a supplementary precoding setting, a refined precoding setting) may then be used. A refined precoding setting may, for example, include a "delta," or incremental change, to be applied to a subsequent transmission. Further precoding refinement may be done along with a subsequent random access procedure (e.g., a transmission of a random access response message can be used to refine UE receive precoding). These and other precoding management techniques for random access procedures are described in the present disclosure. The techniques described below may be used to improve analog precoding or digital precoding, and may be used, for example, in combination with four-operation random access procedures or two operation random access procedures.

Figure 3:
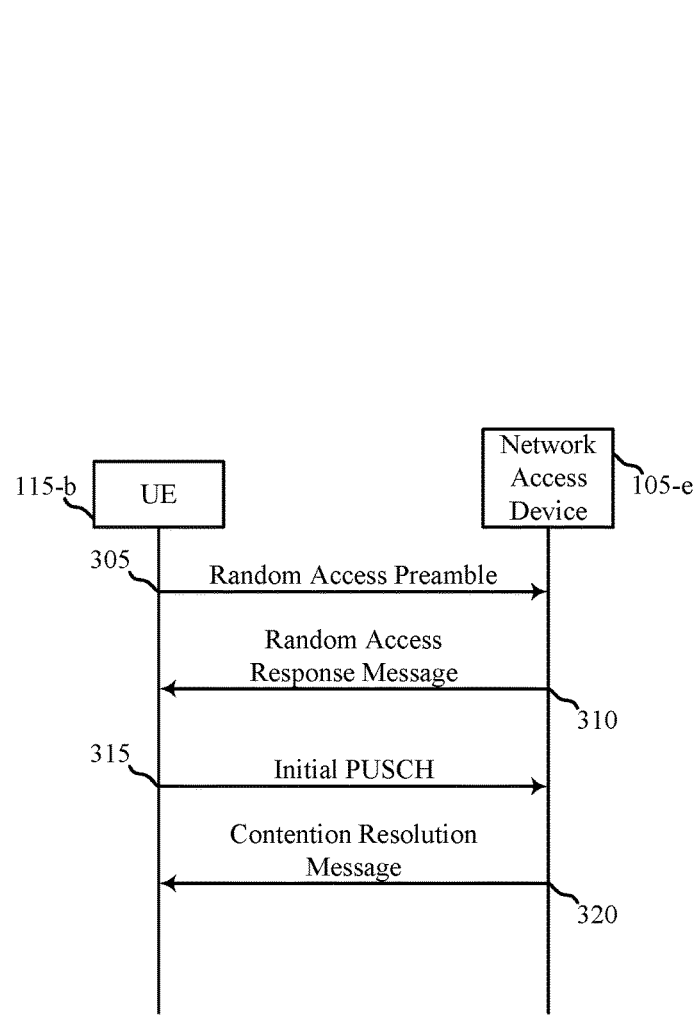
FIG. 3 shows a message flow between a UE and a network access device during performance of a four-operation random access procedure, in accordance with one or more aspects of the present disclosure.

FIG. 3 shows a message flow 300 between a UE 115-b and a network access device 105-e during performance of a four-operation random access procedure, in accordance with one or more aspects of the present disclosure. The UE 115-b may be an example of aspects of the UEs 115 as described with reference to FIG. 1 or 2. The network access device 105-e may be an example of aspects of the network access devices 105 as described with reference to FIG. 1 or 2.

The message flow 300 includes four messages, including a first message (Msg1) transmitted by the UE 115-b to the network access device 105-e at 305, a second message (Msg2) transmitted by the network access device 105-e to the UE 115-b at 310, a third message (Msg3) transmitted by the UE 115-b to the network access device 105-e at 315, and a fourth message (Msg4) transmitted by the network access device 105-e to the UE 115-b at 320.

At 305, a message including a random access preamble may be transmitted on a PRACH of an uplink. In some examples, the random access preamble may be selected from a plurality of preamble sequences, such as a set of 64 preamble sequences associated with a cell. The UE 115-b may identify the plurality of preamble sequences from system information (SI) broadcast by the network access device 105-e.

At 310, and in response to detecting the random access preamble transmitted at 305, the network access device 105-e may transmit a RAR message. In some examples, the RAR message may be transmitted on a physical downlink shared channel (PDSCH), using a random access radio network temporary identifier (RA-RNTI) as a physical identifier (ID). If the network access device 105-e does not detect the random access preamble transmitted at 305, the network access device 105-e will not transmit a RAR message at 310.

The RAR message may include, for example, an index corresponding to the detected random access preamble (e.g., an index of a detected preamble sequence), an uplink grant (e.g., a grant of transmission resources on a PUSCH), an indication of a timing advance, or a temporary cell RNTI (TC-RNTI). In some examples, multiple RAR messages (e.g., RAR messages corresponding to different random access preambles received from different UEs) may be included in a single payload transmitted at 215.

Upon receiving one or more RAR messages transmitted at 310, the UE 115-b may identify a RAR message intended for the UE 115-b based at least in part on detecting, in a RAR message, an index corresponding to the random access preamble transmitted by the UE 115-b at 305. When multiple UEs transmit the same random access preamble on the same transmission resources at 305, all of the UEs may use the same RA-RNTI and identify the same RAR message (transmitted at 310) as intended for itself.

At 315, the UE 115-b may transmit an initial PUSCH using the transmission resources associated with an uplink grant included in a RAR message intended for the UE 115-b. The initial PUSCH transmission may include an RRC Connection Request message and an identifier of the UE 115-b (i.e., a UE identifier). The initial PUSCH transmission may be scrambled using a TC-RNTI included in the RAR message intended for the UE 115-b. Upon transmitting an initial PUSCH transmission at 315, the UE 115-b may start a contention resolution timer.

At 320, and in response to decoding the initial PUSCH transmission of the UE 115-b at 315, the network access device 105-e may transmit a contention resolution message to the UE 115-b. In some examples, the contention resolution message may be transmitted on the PDSCH, and may be scrambled using the same TC-RNTI used to scramble the initial PUSCH transmission transmitted at 315. However, if the network access device 105-e cannot decode the initial PUSCH transmission transmitted at 315, the network access device 105-e will not transmit a contention resolution message at 320, and the contention resolution timer started by the UE 115-b may expire, thereby causing the UE 115-b to initiate a new random access procedure.

Figure 4:
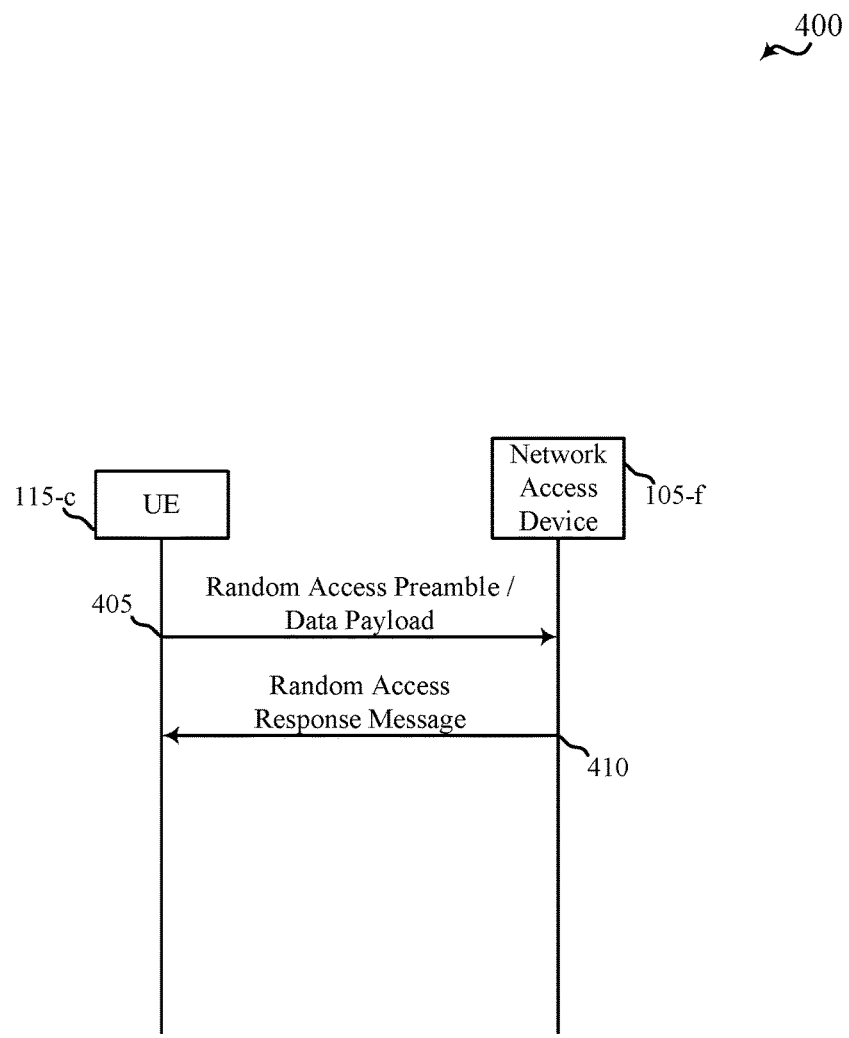
FIG. 4 shows a message flow between a UE and a network access device during performance of a two-operation random access procedure, in accordance with one or more aspects of the present disclosure.

FIG. 4 shows a message flow 400 between a UE 115-c and a network access device 105-f during performance of a two-operation random access procedure, in accordance with one or more aspects of the present disclosure. The UE 115-c may be an example of aspects of the UEs 115 as described with reference to FIG. 1, 2, or 3. The network access device 105-f may be an example of aspects of the network access devices 105 as described with reference to FIG. 1, 2, or 3.

The message flow 400 includes two messages, including a first message (Msg1) transmitted by the UE 115-c to the network access device 105-f at 405, and a second message (Msg2) transmitted by the network access device 105-f to the UE 115-c at 410.

At 405, a message including a random access preamble and a data payload may be transmitted on an ePRACH of an uplink. The data payload may include an RRC Connection Request message and an identifier of the UE 115-c (i.e., a UE identifier).

At 410, and in response to detecting the random access preamble transmitted at 405, the network access device 105-f may transmit a RAR message including an initial PDSCH transmission. In some examples, the RAR message may be transmitted on a PDSCH. If the network access device 105-f does not detect the random access preamble transmitted at 405, the network access device 105-f will not transmit a RAR message at 410.

The RAR message may include, for example, an index corresponding to the detected random access preamble (e.g., an index of a detected preamble sequence), an uplink grant (e.g., a grant of transmission resources on a PUSCH), or an indication of a timing advance.

In some examples, a UE 115 as described with reference to FIG. 1, 2, 3, or 4 may transmit precoder selection signals from at least two antennas of the UE 115 during performance of a random access procedure over a wireless network (e.g., during performance of a random access procedure with a network access device 105). The network access device 105 may receive the precoder selection signals, identify a refined precoding setting for the UE 115 based at least in part on the precoder selection signals, and transmit an indication of the refined precoding setting to the UE 115. The UE 115 may receive the indication of the refined precoding setting during the random access procedure, and may apply the refined precoding setting to at least one transmission in the random access procedure (e.g., to an initial PUSCH transmission and/or a retransmission of the initial PUSCH transmission) and/or to at least one transmission following the random access procedure (e.g., to a subsequent PUSCH transmission and/or a transmission of a subsequent random access procedure).

In some examples, the precoder selection signals transmitted by a UE 115 during a random access procedure may include at least a first MRS transmitted from a first antenna (e.g., antenna port 0) and a second MRS transmitted from a second antenna (e.g., antenna port 1). The first MRS and the second MRS may be transmitted with at least one of a PRACH transmission (e.g., at 305 as described with reference to FIG. 3), an initial PUSCH transmission (e.g., at 315 as described with reference to FIG. 3), or an ePRACH transmission (e.g., at 405 as described with reference to FIG. 4). In some examples, each of the first MRS and the second MRS may be formatted similarly to an LTE/LTE-A sounding reference signal (SRS), and may be transmitted along with or combined with the channel transmission. When the first MRS and second MRS are appended to a PRACH transmission, a UE 115 may receive an indication of a precoder setting that may be applied to a subsequent PUSCH transmission, for example. When the first MRS and second MRS are appended to an initial PUSCH transmission, a UE 115 may receive an indication of a precoder setting that may be applied to a retransmission of the initial PUSCH transmission.

In some examples, the precoder selection signals transmitted by a UE 115 during a random access procedure may include at least a first DMRS and a first part of a data transmission transmitted from a first antenna, in accordance with a preconfigured antenna rotation, and a second DMRS and a second part of the data transmission transmitted from a second antenna, in accordance with the preconfigured antenna rotation. In some examples, the data transmission may include a data payload of an ePRACH transmission or an initial PUSCH transmission. A network access device 105 with a priori knowledge of the preconfigured antenna rotation may receive transmissions from UE 115 and determine a first error rate associated with the first part of the data transmission and a second error rate associated with the second part of the data transmission, and may identify a refined precoding setting for the UE 115 based at least in part on the first error rate and the second error rate.

In some examples, the precoder selection signals transmitted by a UE 115 during a random access procedure may include at least a first DMRS and a first part of a data transmission transmitted from at least a first antenna and a second antenna using a first precoder, in accordance with a preconfigured precoder cycling, and a second DMRS and a second part of the data transmission transmitted from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission. A network access device 105 with a priori knowledge of the preconfigured precoder cycling may receive transmissions from UE 115 and determine a first error rate associated with the first part of the data transmission and a second error rate associated with the second part of the data transmission, and may identify a refined precoding setting for the UE 115 based at least in part on the first error rate and the second error rate.

In some examples, a network access device 105 may transmit system information (e.g., information transmitted in a system information block (SIB) or a master information block (MIB)) including an indication that precoder selection signal reception is enabled (e.g., an indication of whether a UE 115 may (or should) or may not (or should not) transmit precoder selection signals). Additionally or alternatively, a network access device 105 may transmit system information including an indication of a type of precoder selection signal reception that is enabled (e.g., MRS-based, DMRS-based, antenna rotation-based, precoder cycling-based, etc.).

In some examples, a network access device 105 may transmit to a UE 115, during the performance by the UE 115 of a random access procedure, a transmission (e.g., a random access response message) including a RAR grant, or downlink control information (DCI) scheduling information for an initial PUSCH transmission, or a combination thereof. In some examples, such a transmission may include a number of precoder selection signal parameters, such as a bandwidth of the precoder selection signals, or a cyclic shift of the precoder selection signals, or a number of antenna ports from which to transmit the precoder selection signals, or a combination thereof. In the same or other examples, such a transmission may include an indication of a refined precoding setting for the UE 115.

By transmitting precoder selection signal parameters in a transmission such as a RAR grant, or DCI scheduling information for an initial PUSCH transmission, a next message transmitted by a UE 115 during a random access procedure, or a transmission such as a subsequent PUSCH or message of a subsequent random access procedure, may be transmitted using a precoder that is more tailored to the UE 115. In some examples, an initial transmission of a first MRS and a second MRS may be made in a bandwidth that matches the bandwidth of a PRACH transmission, and a next transmission of a first MRS and a second MRS may be made in a bandwidth that matches the bandwidth of a PUSCH transmission.

In some examples, the precoding for an initial PUSCH transmission may be set or initialized based at least in part on the precoding used for a last successful random access procedure. In some examples, the precoding for an initial PUSCH transmission may be refined based on a refined precoding setting received in a random access response message (e.g., in a RAR grant or DCI scheduling information for the initial PUSCH transmission, or for an initial PUSCH transmission of a prior random access procedure). In some examples, the refined precoding setting may take the form of a precoding matrix indicator (PMI) delta (e.g., a delta_PMI).

In some examples, some of the UEs 115 in a wireless communication system may be capable of transmitting precoder selection signals, and other UEs 115 may not be capable of transmitting precoder selection signals. In these examples, it can be useful to identify the capability of a UE 115 early. In this regard, a network access device 105 may transmit system information including a first indication of a first set of resources associated with single antenna random access procedures (e.g., single-antenna-port capability), and a second indication of a second set of resources associated with multiple antenna random access procedures (e.g., multiple-antenna-port capability). A UE 115 that receives the system information may identify (e.g., select) a set of resources associated with its capability and perform a random access procedure by transmitting a PRACH or an ePRACH on the identified set of resources. Transmission by the UE 115 of precoder selection signals may be configured accordingly. Upon receipt of the PRACH or ePRACH from the UE 115 on a particular set of resources, the network access device 105 may identify the capability of the UE 115. Alternatively, a UE 115 may always transmit MRSs along with a PRACH, ePRACH, or initial PUSCH transmission (e.g., on two virtual antenna ports), even when the UE 115 only has a single-antenna-port capability, and a network access device 105 may blindly detect whether the UE 115 is capable of single or multiple antenna port transmissions based on the received MRSs.

Figure 5:
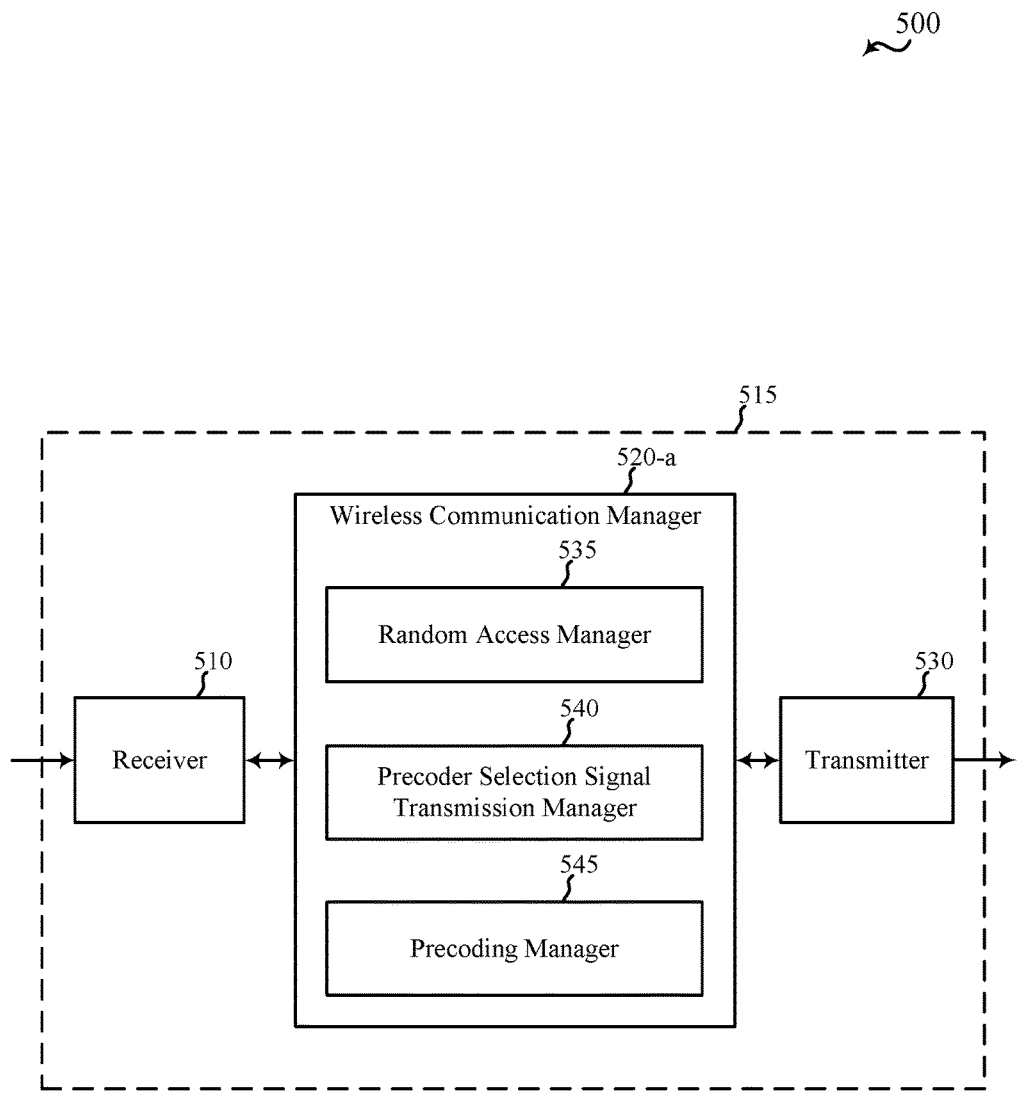
FIG. 5 shows a diagram of an apparatus for use in wireless communication, in accordance with one or more aspects of the present disclosure.

FIG. 5 shows a diagram 500 of an apparatus 515 for use in wireless communication, in accordance with one or more aspects of the present disclosure. The apparatus 515 may be an example of aspects of one or more of the UEs 115 as described with reference to FIG. 1, 2, 3, or 4. The apparatus 515 may also be or include a processor. The apparatus 515 may include a receiver 510, a wireless communication manager 520-a, or a transmitter 530. Each of these components may be in communication with each other.

The components of the apparatus 515 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, Field Programmable Gate Arrays (FPGAs), a System-on-Chip (SoC), and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 510 may include at least one radio frequency (RF) receiver, such as at least one RF receiver operable to receive transmissions over one or more radio frequency spectrum bands. In some examples, the one or more radio frequency spectrum bands may be used for communicating as described with reference to FIG. 1, 2, 3, or 4. The receiver 510 may be used to receive various types of data or control signals (i.e., transmissions) over one or more communication links of a wireless communication system, such as one or more communication links of the wireless communication system 100 as described with reference to FIG. 1.

In some examples, the transmitter 530 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, or 4. The transmitter 530 may be used to transmit various types of data or control signals (i.e., transmissions) over one or more communication links of a wireless communication system, such as one or more communication links of the wireless communication system 100 as described with reference to FIG. 1.

In some examples, the wireless communication manager 520-a may be used to manage one or more aspects of wireless communication for the apparatus 515. In some examples, part of the wireless communication manager 520-a may be incorporated into or shared with the receiver 510 or the transmitter 530. In some examples, the wireless communication manager 520-a may be an example of aspects of the wireless communication manager 520 as described with reference to FIG. 1. In some examples, the wireless communication manager 520-a may include a random access manager 535, a precoder selection signal transmission manager 540, or a precoding manager 545.

The random access manager 535 may be used to perform a random access procedure over a wireless network. The random access manager 535 may be used to transmit during a random access procedure (e.g., to transmit a PRACH transmission, or an ePRACH transmission, or an initial PUSCH transmission, or a combination thereof) and receive during a random access procedure (e.g., to receive a RAR grant, DCI scheduling information for an initial PUSCH transmission, or a combination thereof).

The precoder selection signal transmission manager 540 may be used to transmit precoder selection signals from at least two antennas associated with the transmitter 530. The precoder selection signals may be transmitted during the performance of a random access procedure by the wireless communication manager 520-a, and may be transmitted with a PRACH transmission, or an ePRACH transmission, or an initial PUSCH transmission, or a combination thereof.

The precoding manager 545 may be used to receive, from the wireless network during a random access procedure performed by the wireless communication manager 520-a, an indication of a refined precoding setting for the wireless communication manager 520-a. In some examples, the refined precoding setting may be based at least in part on precoder selection signals transmitted by the wireless communication manager 520-a during a current random access procedure being performed by the wireless communication manager 520-a; based at least in part on prior-transmitted precoder selection signals transmitted by the wireless communication manager 520-*a* during a prior random access procedure performed by the wireless communication manager 520-*a*; or based at least in part on a combination thereof.

Figure 6:
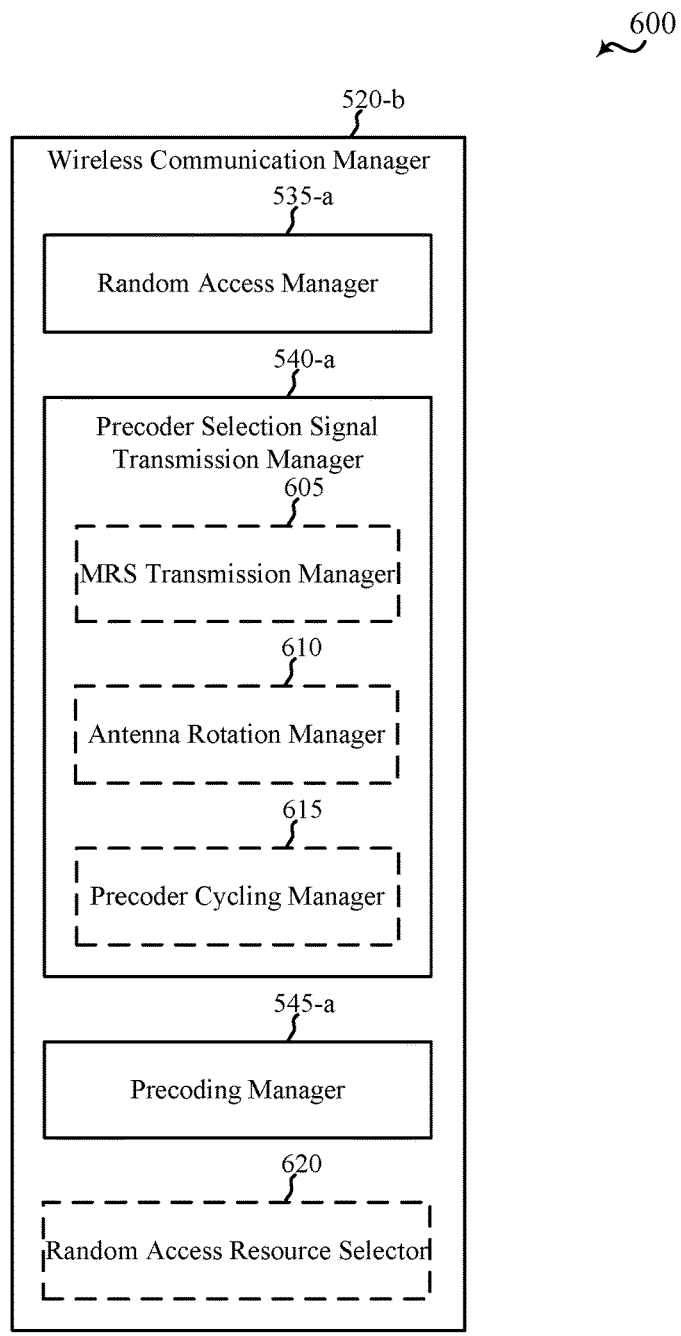
FIG. 6 shows a diagram of a wireless communication manager for use in wireless communication, in accordance with one or more aspects of the present disclosure.

FIG. 6 shows a diagram 600 of a wireless communication manager 520-*b* for use in wireless communication, in accordance with one or more aspects of the present disclosure. The wireless communication manager 520-*b* may be an example of aspects of the wireless communication manager 520 as described with reference to FIG. 1 or 5.

The components of the wireless communication manager 520-*b* may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 520-*b* may be used to manage one or more aspects of wireless communication for a UE or apparatus, such as one of the UEs 115 or apparatuses 515 as described with reference to FIG. 1, 2, 3, 4, or 5. In some examples, part of the wireless communication manager 520-*b* may be incorporated into or shared with a receiver or a transmitter (e.g., the receiver 510 or the transmitter 530 as described with reference to FIG. 5). In some examples, the wireless communication manager 520-*b* may include a random access manager 535-*a*, a precoder selection signal transmission manager 540-*a*, a precoding manager 545-*a*, or a random access resource selector 620.

The random access manager 535-*a* may be used to perform a random access procedure over a wireless network. The random access manager 535-*a* may be used to transmit during a random access procedure (e.g., to transmit a PRACH transmission, or an ePRACH transmission, or an initial PUSCH transmission, or a combination thereof) and receive during a random access procedure (e.g., to receive a RAR grant, DCI scheduling information for an initial PUSCH transmission, or a combination thereof).

The precoder selection signal transmission manager 540-*a* may be used to transmit precoder selection signals from at least two antennas associated with the wireless communication manager 520-*b*. The precoder selection signals may be transmitted during the performance of a random access procedure by the wireless communication manager 520-*b*, and may be transmitted with a PRACH transmission, or an ePRACH transmission, or an initial PUSCH transmission, or a combination thereof.

In some examples, the precoder selection signal transmission manager 540-*a* may include an MRS transmission manager 605, an antenna rotation manager 610, or a precoder cycling manager 615. The MRS transmission manager 605 may be used to transmit precoder selection signals including a first MRS transmitted from a first antenna, and a second MRS transmitted from a second antenna. In some examples, the first MRS and the second MRS may be transmitted with at least one of a PRACH transmission, or an ePRACH transmission, or an initial PUSCH transmission, or a combination thereof.

The antenna rotation manager 610 may be used to transmit a first DMRS and a first part of a data transmission from a first antenna, in accordance with a preconfigured antenna rotation, and to transmit a second DMRS and a second part of the data transmission from a second antenna, in accordance with the preconfigured antenna rotation. In some examples, the data transmission may include a data payload of an ePRACH transmission or an initial PUSCH transmission.

The precoder cycling manager 615 may be used to transmit a first DMRS and a first part of a data transmission from at least a first antenna and a second antenna using a first precoder, in accordance with a preconfigured precoder cycling, and to transmit a second DMRS and a second part of the data transmission from at least the first antenna and the second antenna using a second precoder, in accordance with the preconfigured precoder cycling. The second precoder may be different from the first precoder. In some examples, the data transmission may include a data payload of an ePRACH transmission or an initial PUSCH transmission.

The precoding manager 545-*a* may be used to receive, from the wireless network during a random access procedure performed by the wireless communication manager 520-*b*, an indication of a refined precoding setting for the wireless communication manager 520-*b*. In some examples, the refined precoding setting may be based at least in part on precoder selection signals transmitted by the wireless communication manager 520-*b* during a current random access procedure being performed by the wireless communication manager 520-*b*; based at least in part on prior-transmitted precoder selection signals transmitted by the wireless communication manager 520-*b* during a prior random access procedure performed by the wireless communication manager 520-*b*; or based at least in part on a combination thereof.

In some examples, the precoding manager 545-*a* may be used to apply a refined precoding setting for the wireless communication manager 520-*b* to at least one transmission in a current random access procedure being performed by the wireless communication manager 520-*b*. In some examples, the at least one transmission may include at least one of an initial PUSCH transmission, or a retransmission of the initial PUSCH transmission, or a combination thereof. In some examples, the precoding manager 545-*a* may be used to apply a refined precoding setting for the wireless communication manager 520-*b* to at least one transmission following a current random access procedure.

In some examples, the random access manager 535-*a* may be used to transmit, during the performance of a random access procedure by the wireless communication manager 520-*b*, an ePRACH transmission or an initial PUSCH transmission. The ePRACH transmission or initial PUSCH transmission may be transmitted using a first precoder based at least in part on the indication of the refined precoding setting for the wireless communication manager 520-*b*, or a second precoder used by the wireless communication manager 520-*b* during a prior successful random access procedure.

In some examples, the precoding manager 545-*a* may be used to receive system information including a first indication that precoder selection signal reception is enabled, or a second indication of a type of precoder selection signal reception that is enabled, or a combination thereof. In these examples, the precoder selection signal transmission manager 540-*a* may be used to transmit precoder selection signals in response to receiving at least the first indication or the second indication.

In some examples, the random access manager 535-*a* may receive, during performance of a random access procedure by the wireless communication manager 520-*b*, a transmission including at least one of a RAR grant, or DCI scheduling information for an initial PUSCH transmission, or a combination thereof. In some examples, the transmission may include at least one precoder selection signal parameter. The at least one precoder selection signal parameter may include a bandwidth of precoder selection signals, or a cyclic shift of precoder selection signals, or a number of antenna ports from which to transmit precoder selection signals, or a combination thereof. In some examples, the transmission may include an indication of a refined precoding setting for the wireless communication manager 520-*b*.

In some examples, the random access manager 535-*a* may be used to transmit, during the performance of a random access procedure by the wireless communication manager 520-*b*, an initial PUSCH. In some examples, precoder selection signals from at least two antennas associated with the wireless communication manager 520-*b* may be transmitted with the initial PUSCH. In some examples, the precoder selection signals may be based at least in part on the precoder selection signal parameter(s).

In some examples, the random access resource selector 620 may be used to identifying a set of resources associated with multiple antenna random access procedures. In these examples, the random access manager 535-*a* may be used to transmit at least one of a PRACH or an ePRACH, on the identified set of resources, while the wireless communication manager 520-*b* performs a random access procedure. The precoder selection signal transmission manager 540-*a* may be used to transmit precoder selection signals from at least two antennas associated with the wireless communication manager 520-*b* during the random access procedure (e.g., with the PRACH or the ePRACH).

Figure 7:
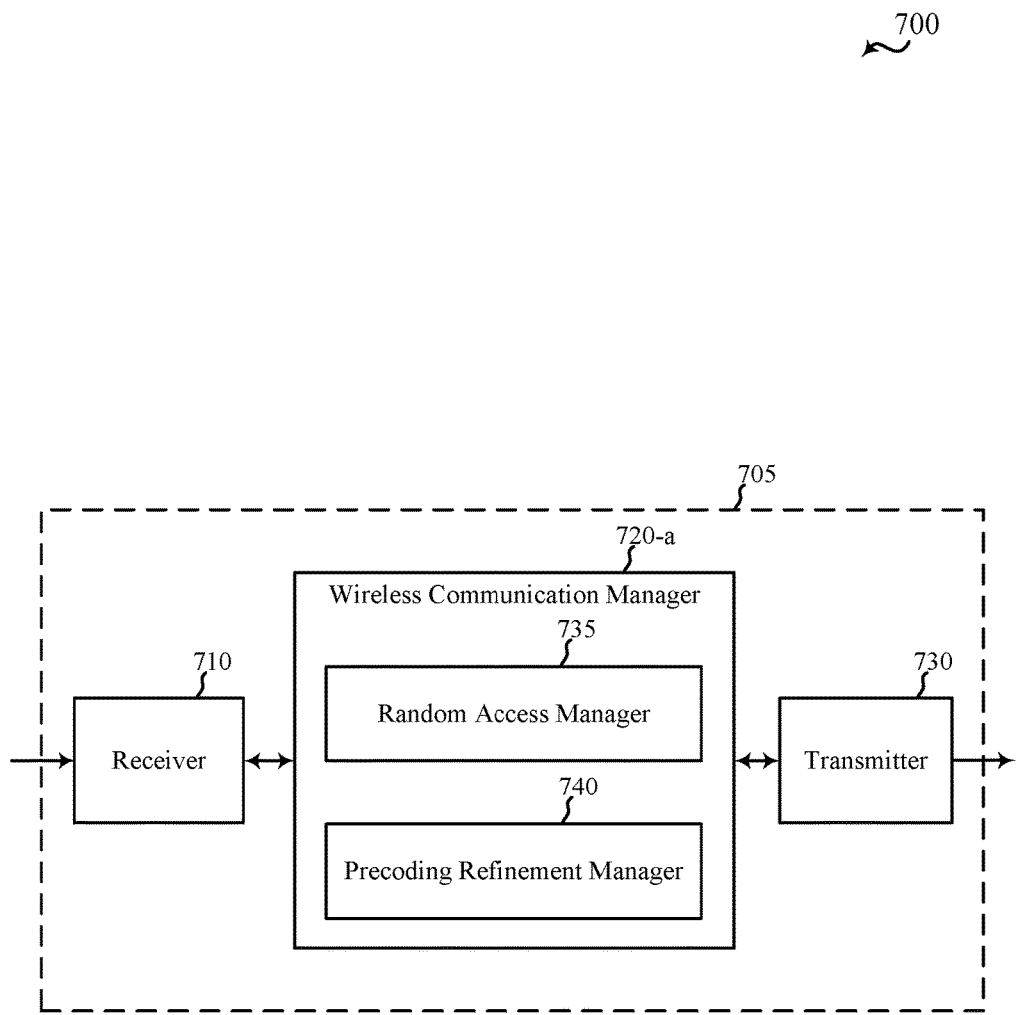
FIG. 7 shows a diagram of an apparatus for use in wireless communication, in accordance with one or more aspects of the present disclosure.

FIG. 7 shows a diagram 700 of an apparatus 705 for use in wireless communication, in accordance with one or more aspects of the present disclosure. The apparatus 705 may be an example of aspects of one or more of the network access devices 105 as described with reference to FIG. 1, 2, 3, or 4. The apparatus 705 may also be or include a processor. The apparatus 705 may include a receiver 710, a wireless communication manager 720-*a*, or a transmitter 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the receiver 710 may include at least one RF receiver, such as at least one RF receiver operable to receive transmissions over one or more radio frequency spectrum bands. In some examples, the one or more radio frequency spectrum bands may be used for communicating as described with reference to FIG. 1, 2, 3, or 4. The receiver 710 may be used to receive various types of data or control signals (i.e., transmissions) over one or more communication links of a wireless communication system, such as one or more communication links of the wireless communication system 100 as described with reference to FIG. 1.

In some examples, the transmitter 730 may include at least one RF transmitter, such as at least one RF transmitter operable to transmit over one or more radio frequency spectrum bands. In some examples, the one or more radio frequency spectrum bands may be used for communicating as described with reference to FIG. 1, 2, 3, or 4. The transmitter 730 may be used to transmit various types of data or control signals (i.e., transmissions) over one or more communication links of a wireless communication system, such as one or more communication links of the wireless communication system 100 as described with reference to FIG. 1.

In some examples, the wireless communication manager 720-*a* may be used to manage one or more aspects of wireless communication for the apparatus 705. In some examples, part of the wireless communication manager 720-*a* may be incorporated into or shared with the receiver 710 or the transmitter 730. In some examples, the wireless communication manager 720-*a* may be an example of aspects of the wireless communication manager 720 as described with reference to FIG. 1. In some examples, the wireless communication manager 720-*a* may include a random access manager 735 or a precoding refinement manager 740.

The random access manager 735 may be used to support the performance of a random access procedure, by a UE, over a wireless network. The random access manager 735 may be used to receive during a random access procedure (e.g., to receive a PRACH transmission, or an ePRACH transmission, or an initial PUSCH transmission, or a combination thereof) and transmit during a random access procedure (e.g., to transmit a RAR grant, DCI scheduling information for an initial PUSCH transmission, or a combination thereof).

The precoding refinement manager 740 may be used to receive, from a UE during a random access procedure performed by the UE, precoder selection signals from at least two antennas of the UE. The precoding refinement manager 740 may also be used to identify a refined precoding setting for the UE based at least in part on the received precoder selection signals. The refined precoding setting may also or alternatively be based at least in part on prior-received precoder selection signals received during a prior random access procedure performed by the UE. Still further, the precoding refinement manager 740 may be used to transmit an indication of the refined precoding setting to the UE. In some examples, the precoding refinement manager 740 may be used in cooperation with the random access manager 735 to transmit an indication of the refined precoding setting to the UE.

In some examples, the random access manager 735 may be used to receive at least one transmission from the UE in accordance with the indicated refined precoding setting. In some examples, the at least one transmission may include at least one transmission in the random access procedure (e.g., an initial PUSCH transmission, or a retransmission of the initial PUSCH transmission, or a combination thereof) or at least one transmission following the random access procedure (e.g., a PUSCH transmission or a transmission that is part of a subsequent random access procedure).

Figure 8:
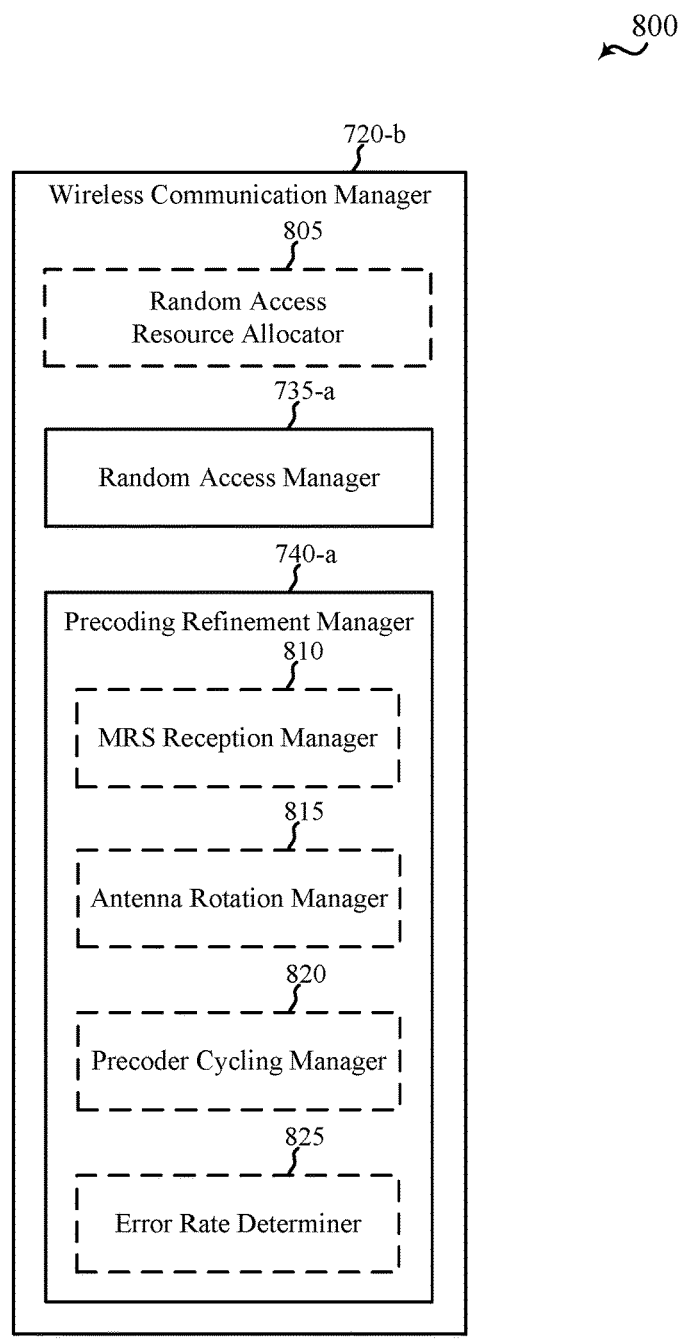
FIG. 8 shows a diagram of a wireless communication manager for use in wireless communication, in accordance with one or more aspects of the present disclosure.

FIG. 8 shows a diagram 800 of a wireless communication manager 720-*b* for use in wireless communication, in accordance with one or more aspects of the present disclosure. The wireless communication manager 720-*b* may be an example of aspects of the wireless communication manager 720 as described with reference to FIG. 1 or 7.

The components of the wireless communication manager 720-b may, individually or collectively, be implemented using one or more ASICs adapted to perform some or all of the applicable functions in hardware. Alternatively, the functions may be performed by one or more other processing units (or cores), on one or more integrated circuits. In some other examples, other types of integrated circuits may be used (e.g., Structured/Platform ASICs, FPGAs, a SoC, and/or other types of Semi-Custom ICs), which may be programmed in any manner known in the art. The functions of each component may also be implemented, in whole or in part, with instructions embodied in a memory, formatted to be executed by one or more general or application-specific processors.

In some examples, the wireless communication manager 720-b may be used to manage one or more aspects of wireless communication for a network access device or apparatus, such as one of the network access devices 105 or apparatuses 705 as described with reference to FIG. 1, 2, 3, 4, or 7. In some examples, part of the wireless communication manager 720-b may be incorporated into or shared with a receiver or a transmitter (e.g., the receiver 710 or the transmitter 730 as described with reference to FIG. 7). In some examples, the wireless communication manager 720-b may include a random access resource allocator 805, a random access manager 735-a or a precoding refinement manager 740-a.

In some examples, the random access resource allocator 805 may be used to transmit system information including a first indication of a first set of resources associated with single antenna random access procedures, and a second indication of a second set of resources associated with multiple antenna random access procedures.

The random access manager 735-a may be used to support the performance of a random access procedure, by a UE, over a wireless network. The random access manager 735-a may be used to receive during a random access procedure (e.g., to receive a PRACH transmission, or an ePRACH transmission, or an initial PUSCH transmission, or a combination thereof) and transmit during a random access procedure (e.g., to transmit a RAR grant, DCI scheduling information for an initial PUSCH transmission, or a combination thereof).

The precoding refinement manager 740-a may be used to receive, from a UE during a random access procedure performed by the UE, precoder selection signals from at least two antennas of the UE. The precoding refinement manager 740-a may also be used to identify a refined precoding setting for the UE based at least in part on the received precoder selection signals. The refined precoding setting may also or alternatively be based at least in part on prior-received precoder selection signals received during a prior random access procedure performed by the UE. Still further, the precoding refinement manager 740-a may be used to transmit an indication of the refined precoding setting to the UE. In some examples, the precoding refinement manager 740-a may be used in cooperation with the random access manager 735-a to transmit an indication of the refined precoding setting to the UE.

In some examples, the precoding refinement manager 740-a may include an MRS reception manager 810, an antenna rotation manager 815, a precoder cycling manager 820, or an error rate determiner 825. The MRS reception manager 810 may be used to receive precoder selection signals including a first MRS transmitted from a first antenna of the UE, and a second MRS transmitted from a second antenna of the UE. In some examples, the first MRS and the second MRS may be transmitted with at least one of a PRACH transmission, or an ePRACH transmission, or an initial PUSCH transmission, or a combination thereof.

The antenna rotation manager 815 may be used to receive a first DMRS and a first part of a data transmission from a first antenna of the UE, in accordance with a preconfigured antenna rotation, and to receive a second DMRS and a second part of the data transmission from a second antenna of the UE, in accordance with the preconfigured antenna rotation. In some examples, the data transmission may include a data payload of an ePRACH transmission or an initial PUSCH transmission. In some examples, the error rate determiner 825 may be used to determine a first error rate associated with the first part of the data transmission, and a second error rate associated with the second part of the data transmission. The precoding refinement manager 740-a may then identify the refined precoding setting for the UE based at least in part on the first error rate and the second error rate.

The precoder cycling manager 820 may be used to receive a first DMRS and a first part of a data transmission from at least a first antenna and a second antenna of the UE, in accordance with a first precoder and a preconfigured precoder cycling, and to receive a second DMRS and a second part of the data transmission from at least the first antenna and the second antenna of the UE, in accordance with a second precoder and the preconfigured precoder cycling. The second precoder may be different from the first precoder. In some examples, the data transmission may include a data payload of an ePRACH transmission or an initial PUSCH transmission. In some examples, the error rate determiner 825 may be used to determine a first error rate associated with the first part of the data transmission, and a second error rate associated with the second part of the data transmission. The precoding refinement manager 740-a may then identify the refined precoding setting for the UE based at least in part on the first error rate and the second error rate.

In some examples, the random access manager 735-a may be used to receive at least one transmission from the UE in accordance with the indicated refined precoding setting. In some examples, the at least one transmission may include at least one transmission in the random access procedure (e.g., an initial PUSCH transmission, or a retransmission of the initial PUSCH transmission, or a combination thereof) or at least one transmission following the random access procedure (e.g., a PUSCH transmission or a transmission that is part of a subsequent random access procedure).

In some examples, the precoding refinement manager 740-a may be used to transmit system information including a first indication that precoder selection signal reception is enabled, or a second indication of a type of precoder selection signal reception that is enabled, or a combination thereof. In these examples, the precoding refinement manager 740-a may be used to receive precoder selection signals in response to transmitting at least the first indication or the second indication.

In some examples, the random access manager 735-a may transmit, during the performance of the random access procedure by the UE, a transmission including at least one of a RAR grant, or DCI scheduling information for an initial PUSCH transmission, or a combination thereof. In some examples, the transmission may include at least one precoder selection signal parameter. The at least one precoder selection signal parameter may include a bandwidth of precoder selection signals, or a cyclic shift of precoder selection signals, or a number of antenna ports from which to transmit precoder selection signals, or a combination thereof. In some examples, the precoder selection signals received using the precoding refinement manager 740-*a* may be based at least in part on the precoder selection signal parameter(s).

In some examples, the random access manager 735-*a* may be used to receive at least one of a PRACH or an ePRACH, on the second set of resources identified by the random access resource allocator 805, while the UE performs a random access procedure.

Figure 9:
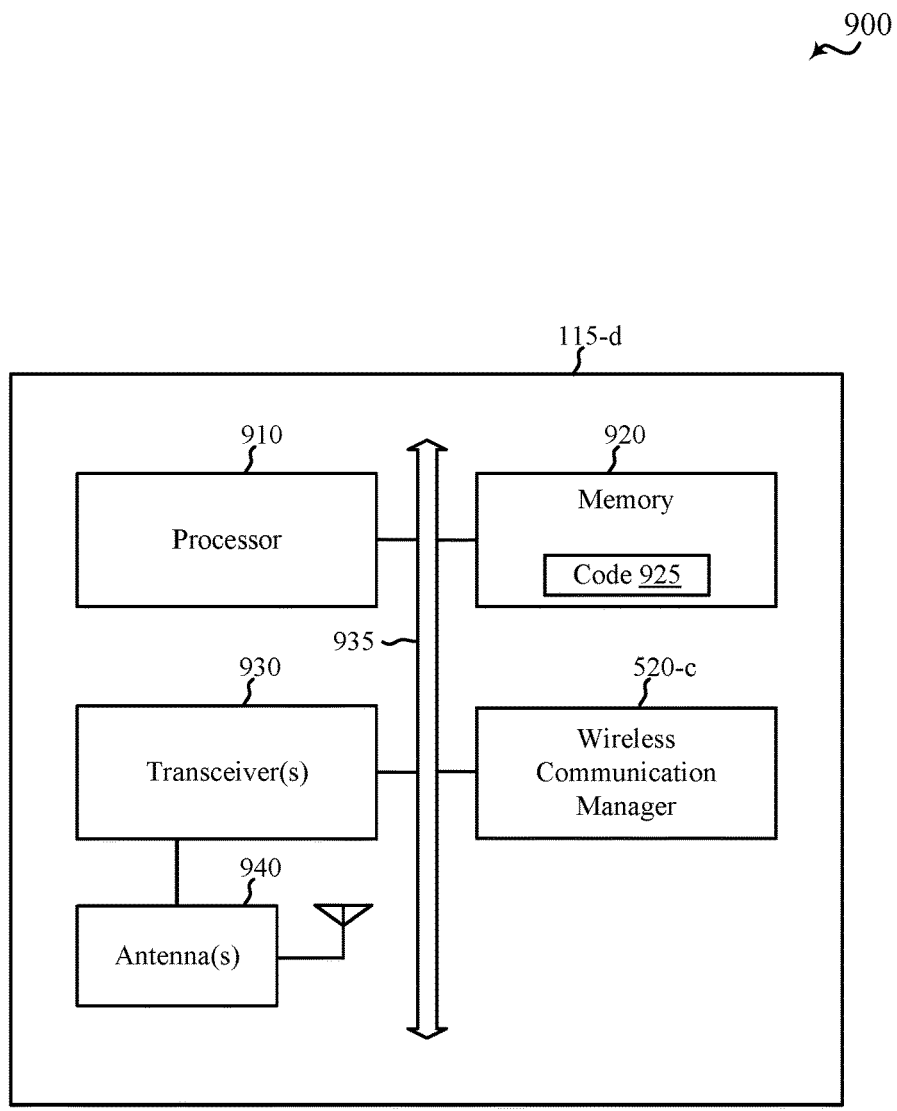
FIG. 9 shows a diagram of a UE for use in wireless communication, in accordance with one or more aspects of the present disclosure.

FIG. 9 shows a diagram 900 of a UE 115-*d* for use in wireless communication, in accordance with one or more aspects of the present disclosure. The UE 115-*d* may be included or be part of a personal computer (e.g., a laptop computer, a netbook computer, a tablet computer, etc.), a cellular telephone, a PDA, a digital video recorder (DVR), an internet appliance, a gaming console, an e-reader, a vehicle, a home appliance, a lighting or alarm control system, etc. The UE 115-*d* may, in some examples, have an internal power supply (not shown), such as a small battery, to facilitate mobile operation. In some examples, the UE 115-*d* may be an example of aspects of one or more of the UEs 115 as described with reference to FIG. 1, 2, 3, or 4, or aspects of the apparatus 515 as described with reference to FIG. 5. The UE 115-*d* may be configured to implement at least some of the UE or apparatus techniques and functions as described with reference to FIG. 1, 2, 3, 4, 5, or 6.

The UE 115-*d* may include a processor 910, a memory 920, at least one transceiver (represented by transceiver(s) 930), antennas 940 (e.g., an antenna array), or a wireless communication manager 520-*c*. Each of these components may be in communication with each other, directly or indirectly, over one or more buses 935.

The memory 920 may include random access memory (RAM) or read-only memory (ROM). The memory 920 may store computer-readable, computer-executable code 925 containing instructions that are configured to, when executed, cause the processor 910 to perform various functions described herein related to wireless communication, including, for example, transmitting precoder selection signals from at least two of the antennas 940 while performing a random access procedure. Alternatively, the computer-executable code 925 may not be directly executable by the processor 910 but be configured to cause the UE 115-*d* (e.g., when compiled and executed) to perform various of the functions described herein.

The processor 910 may include an intelligent hardware device, e.g., a central processing unit (CPU), a microcontroller, an ASIC, etc. The processor 910 may process information received through the transceiver(s) 930 or information to be sent to the transceiver(s) 930 for transmission through the antennas 940. The processor 910 may handle, alone or in connection with the wireless communication manager 520-*c*, one or more aspects of communicating over (or managing communications over) one or more radio frequency spectrum bands.

The transceiver(s) 930 may include a modem configured to modulate packets and provide the modulated packets to the antennas 940 for transmission, and to demodulate packets received from the antennas 940. The transceiver(s) 930 may, in some examples, be implemented as one or more transmitters and one or more separate receivers. The transceiver(s) 930 may support communications in one or more radio frequency spectrum bands. The transceiver(s) 930 may be configured to communicate bi-directionally, via the antennas 940, with one or more of the network access devices 105 as described with reference to FIG. 1, 2, 3, or 4, or the apparatus 705 as described with reference to FIG. 7.

The wireless communication manager 520-*c* may be configured to perform or control some or all of the UE or apparatus techniques or functions as described with reference to FIG. 1, 2, 3, 4, 5, or 6 related to wireless communication. The wireless communication manager 520-*c*, or portions of it, may include a processor, or some or all of the functions of the wireless communication manager 520-*c* may be performed by the processor 910 or in connection with the processor 910. In some examples, the wireless communication manager 520-*c* may be an example of the wireless communication manager 520 as described with reference to FIG. 1, 5, or 6.

Figure 10:
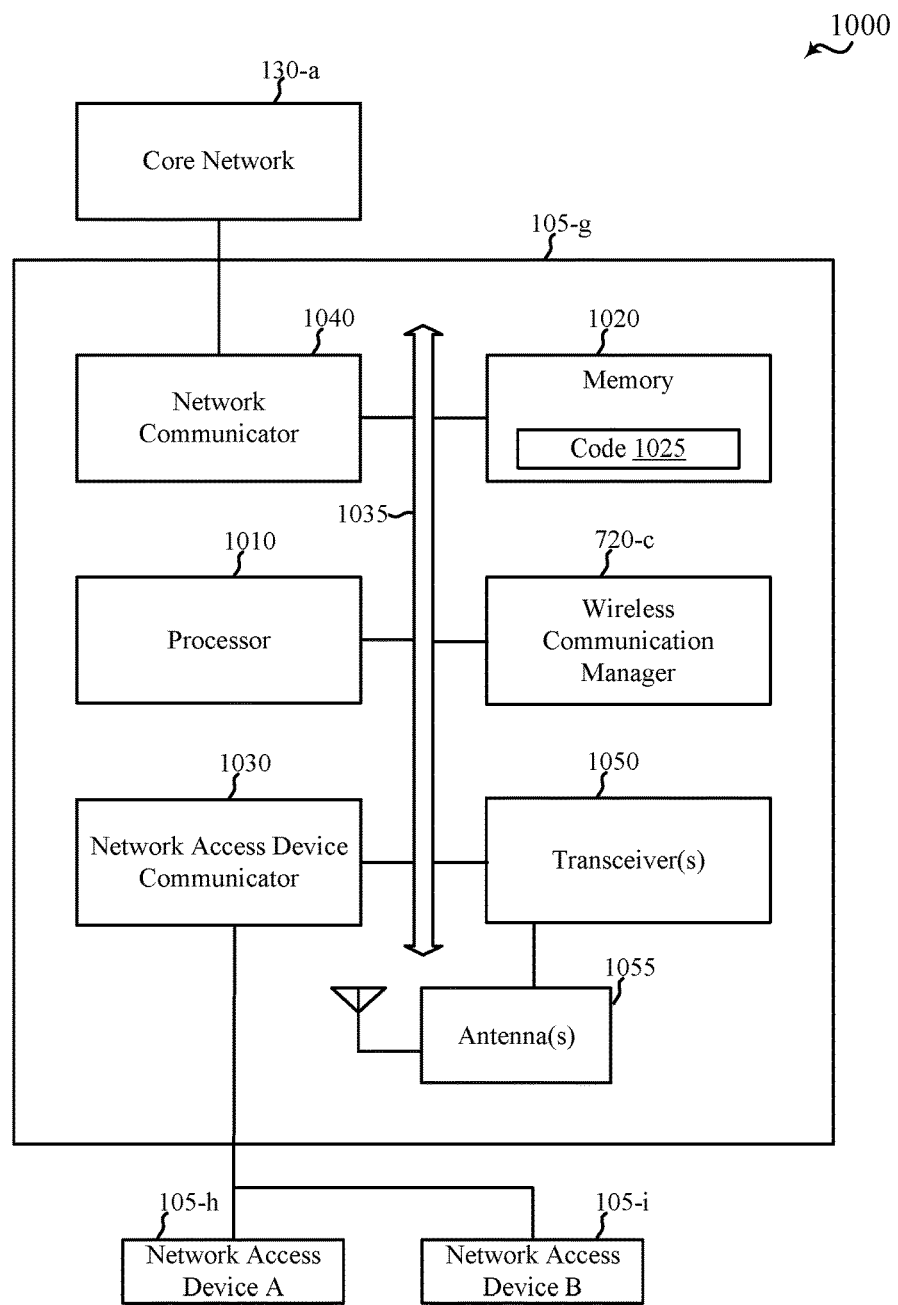
FIG. 10 shows a diagram of a network access device for use in wireless communication, in accordance with one or more aspects of the present disclosure.

FIG. 10 shows a diagram 1000 of a network access device 105-*g* for use in wireless communication, in accordance with one or more aspects of the present disclosure. In some examples, the network access device 105-*g* may be an example of one or more aspects of the network access devices 105 (e.g., a radio head, a base station, an eNB, or an ANC) as described with reference to FIG. 1, 2, 3, or 4, or aspects of the apparatus 705 as described with reference to FIG. 7. The network access device 105-*g* may be configured to implement or facilitate at least some of the network access device techniques and functions as described with reference to FIG. 1, 2, 3, 4, 7, or 8.

The network access device 105-*g* may include a processor 1010, a memory 1020, at least one transceiver (represented by transceiver(s) 1050), antennas 1055 (e.g., an antenna array), or a wireless communication manager 720-*c*. The network access device 105-*g* may also include one or more of a network access device communicator 1030 or a network communicator 1040. Each of these components may be in communication with each other, directly or indirectly, over one or more buses 1035.

The memory 1020 may include RAM or ROM. The memory 1020 may store computer-readable, computer-executable code 1025 containing instructions that are configured to, when executed, cause the processor 1010 to perform various functions described herein related to wireless communication, including, for example, receiving precoder selection signals from at least two antennas of a UE while the UE is performing a random access procedure, identifying a refined precoding setting for the UE based at least in part on the received precoder selection signals, and transmitting an indication of the refined precoding setting to the UE. Alternatively, the computer-executable code 1025 may not be directly executable by the processor 1010 but be configured to cause the network access device 105-*g* (e.g., when compiled and executed) to perform various of the functions described herein.

The processor 1010 may include an intelligent hardware device, e.g., a CPU, a microcontroller, an ASIC, etc. The processor 1010 may process information received through the transceiver(s) 1050, the network access device communicator 1030, or the network communicator 1040. The processor 1010 may also process information to be sent to the transceiver(s) 1050 for transmission through the antennas 1055, or to the network access device communicator 1030 for transmission to one or more other network access devices (e.g., network access device 105-*h* and network access device 105-*i*), or to the network communicator 1040 for transmission to a core network 130-*a*, which may be an example of one or more aspects of the core network 130 as described with reference to FIG. 1. The processor 1010 may handle, alone or in connection with the wireless communication manager 720-c, one or more aspects of communicating over (or managing communications over) one or more radio frequency spectrum bands.

The transceiver(s) 1050 may include a modem configured to modulate packets and provide the modulated packets to the antennas 1055 for transmission, and to demodulate packets received from the antennas 1055. The transceiver(s) 1050 may, in some examples, be implemented as one or more transmitters and one or more separate receivers. The transceiver(s) 1050 may support communications in one or more radio frequency spectrum bands. The transceiver(s) 1050 may be configured to communicate bi-directionally, via the antennas 1055, with one or more UEs or apparatuses, such as one of the UEs 115 as described with reference to FIG. 1, 2, 3, 4, or 9, or the apparatus 515 as described with reference to FIG. 5. The network access device 105-g may communicate with the core network 130-a through the network communicator 1040. The network access device 105-g may also communicate with other network access devices, such as the network access device 105-h and the network access device 105-i, using the network access device communicator 1030.

The wireless communication manager 720-c may be configured to perform or control some or all of the network access device or apparatus techniques or functions as described with reference to FIG. 1, 2, 3, 4, 7, or 8 related to wireless communication. The wireless communication manager 720-c, or portions of it, may include a processor, or some or all of the functions of the wireless communication manager 720-c may be performed by the processor 1010 or in connection with the processor 1010. In some examples, the wireless communication manager 720-c may be an example of the wireless communication manager 720 as described with reference to FIG. 1, 7, or 8.

Figure 11:
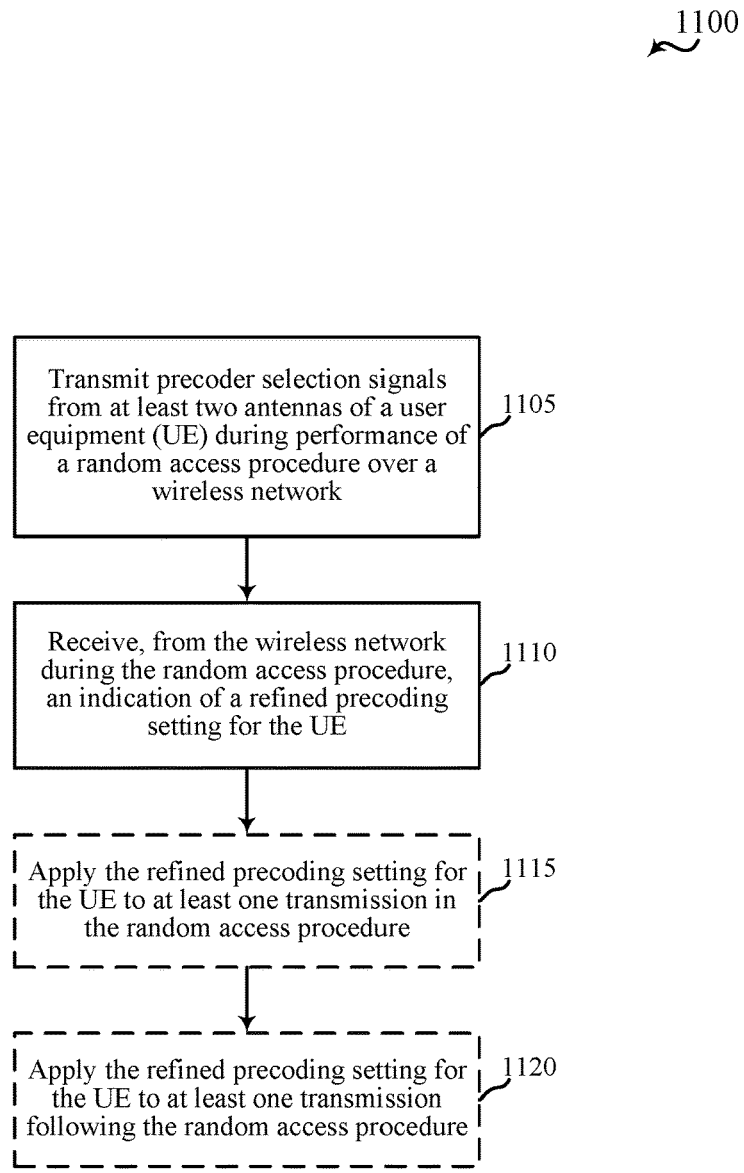
FIGS. 11-18 are flow charts illustrating examples of methods for wireless communication at a UE, in accordance with one or more aspects of the present disclosure.

FIG. 11 is a flow chart illustrating an example of a method 1100 for wireless communication at a UE, in accordance with one or more aspects of the present disclosure. For clarity, the method 1100 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1105, the method 1100 may include transmitting precoder selection signals from at least two antennas of the UE during performance of a random access procedure over a wireless network. The operation(s) at 1105 may be performed using the wireless communication manager 520 as described with reference to FIG. 1, 5, 6, or 9, or the random access manager 535 or precoder selection signal transmission manager 540 as described with reference to FIG. 5 or 6.

At 1110, the method 1100 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1110 may be performed using the wireless communication manager 520 as described with reference to FIG. 1, 5, 6, or 9, or the random access manager 535 or precoding manager 545 as described with reference to FIG. 5 or 6.

At 1115, the method 1100 may optionally include applying the refined precoding setting for the UE to at least one transmission in the random access procedure. In some examples, the at least one transmission may include at least one of an initial PUSCH transmission, or a retransmission of the initial PUSCH transmission, or a combination thereof. The operation(s) at 1115 may be performed using the wireless communication manager 520 as described with reference to FIG. 1, 5, 6, or 9, or the random access manager 535 or precoder selection signal transmission manager 540 as described with reference to FIG. 5 or 6.

At 1120, the method 1100 may optionally include applying the refined precoding setting for the UE to at least one transmission following the random access procedure. The operation(s) at 1120 may be performed using the wireless communication manager 520 as described with reference to FIG. 1, 5, 6, or 9, or the random access manager 535 or precoder selection signal transmission manager 540 as described with reference to FIG. 5 or 6.

Figure 12:
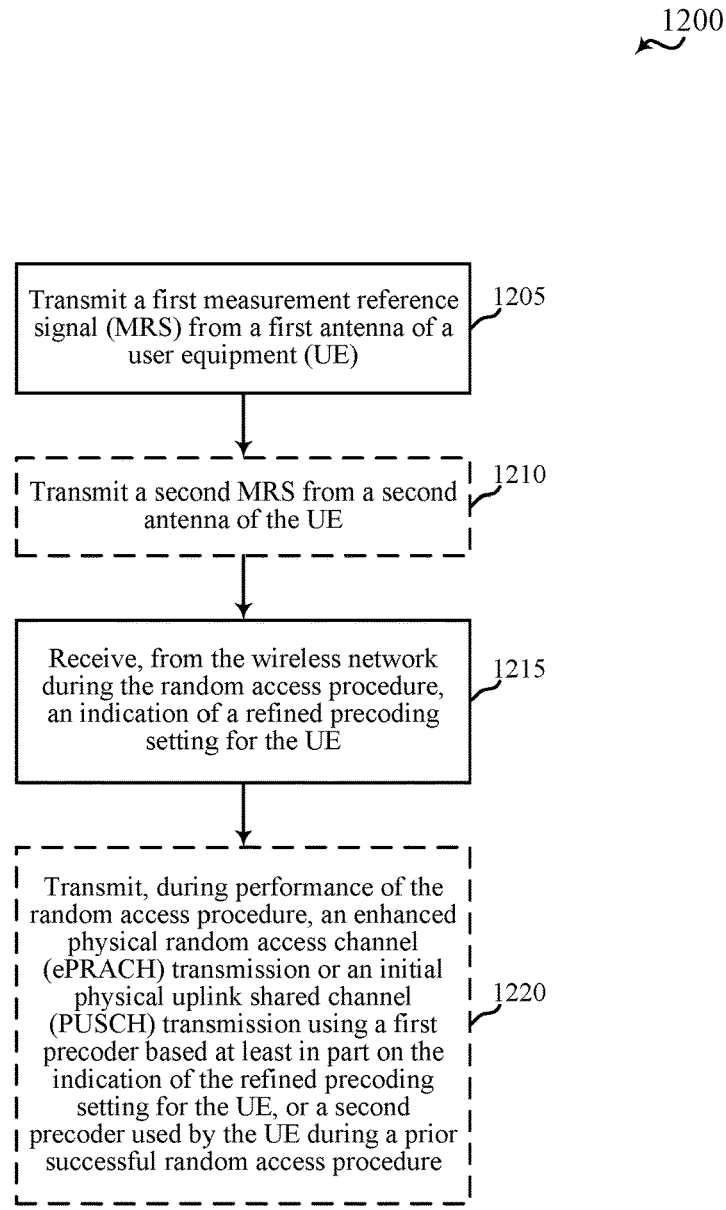

FIG. 12 is a flow chart illustrating an example of a method 1200 for wireless communication at a UE, in accordance with one or more aspects of the present disclosure. For clarity, the method 1200 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1205 and 1210, the method 1200 may include transmitting precoder selection signals from at least two antennas of the UE during performance of a random access procedure over a wireless network. More specifically, the method 1200 may include transmitting a first MRS from a first antenna at 1205, and transmitting a second MRS from a second antenna at 1210. In some examples, the first MRS and the second MRS may be transmitted with at least one of a PRACH transmission, or an ePRACH transmission, or an initial PUSCH transmission, or a combination thereof. The operation(s) at 1205 and 1210 may be performed using the wireless communication manager 520 as described with reference to FIG. 1, 5, 6, or 9, the random access manager 535 or precoder selection signal transmission manager 540 as described with reference to FIG. 5 or 6, or the MRS transmission manager 605 as described with reference to FIG. 6.

At 1215, the method 1200 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1215 may be performed using the wireless communication manager 520 as described with reference to FIG. 1, 5, 6, or 9, or the random access manager 535 or precoding manager 545 as described with reference to FIG. 5 or 6.

At 1220, the method 1200 may optionally include transmitting, during performance of the random access procedure, an ePRACH transmission or an initial PUSCH transmission using a first precoder based at least in part on the indication of the refined precoding setting for the UE, or a second precoder used by the UE during a prior successful random access procedure. The operation(s) at 1220 may be performed using the wireless communication manager 520 as described with reference to FIG. 1, 5, 6, or 9, or the random access manager 535 or precoding manager 545 as described with reference to FIG. 5 or 6.

Figure 13:
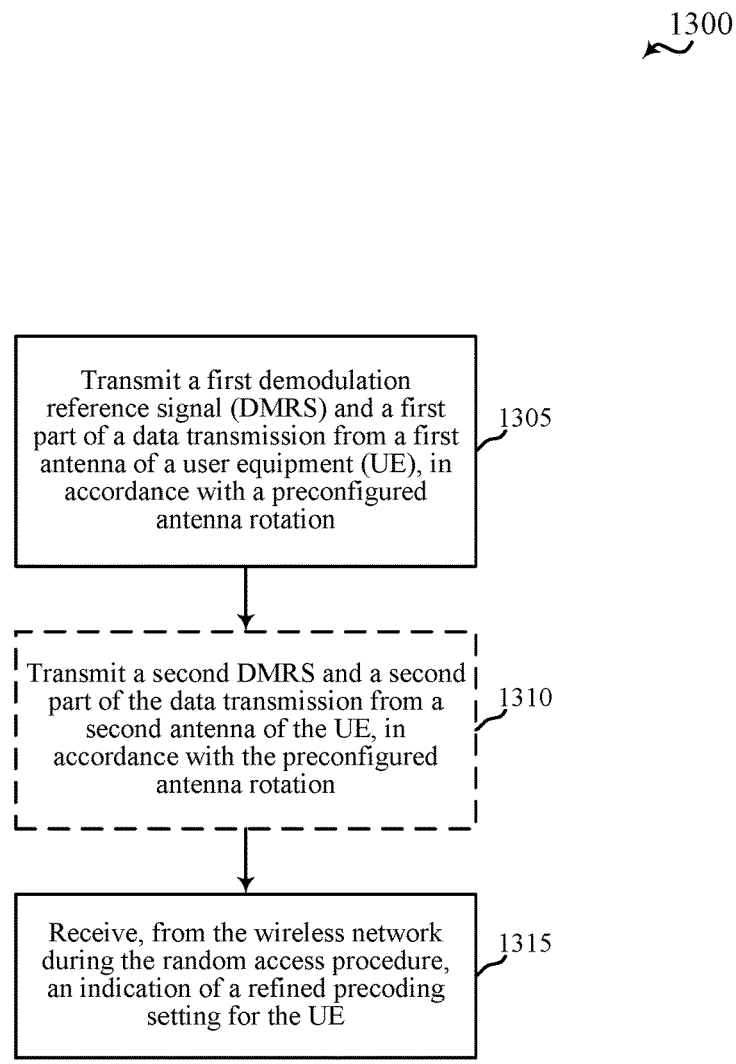

FIG. 13 is a flow chart illustrating an example of a method 1300 for wireless communication at a UE, in accordance with one or more aspects of the present disclosure. For clarity, the method 1300 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1305 and 1310, the method 1300 may include transmitting precoder selection signals from at least two antennas of the UE during performance of a random access procedure over a wireless network. More specifically, the method 1300 may include transmitting a first DMRS and a first part of a data transmission from a first antenna, in accordance with a preconfigured antenna rotation, at 1305, and transmitting a second DMRS and a second part of the data transmission from a second antenna, in accordance with the preconfigured antenna rotation, at 1310. In some examples, the data transmission may include a data payload of an ePRACH transmission or an initial PUSCH transmission. The operation(s) at 1305 and 1310 may be performed using the wireless communication manager 520 as described with reference to FIG. 1, 5, 6, or 9, the random access manager 535 or precoder selection signal transmission manager 540 as described with reference to FIG. 5 or 6, or the antenna rotation manager 610 as described with reference to FIG. 6.

At 1315, the method 1300 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1315 may be performed using the wireless communication manager 520 as described with reference to FIG. 1, 5, 6, or 9, or the random access manager 535 or precoding manager 545 as described with reference to FIG. 5 or 6.

Figure 14:
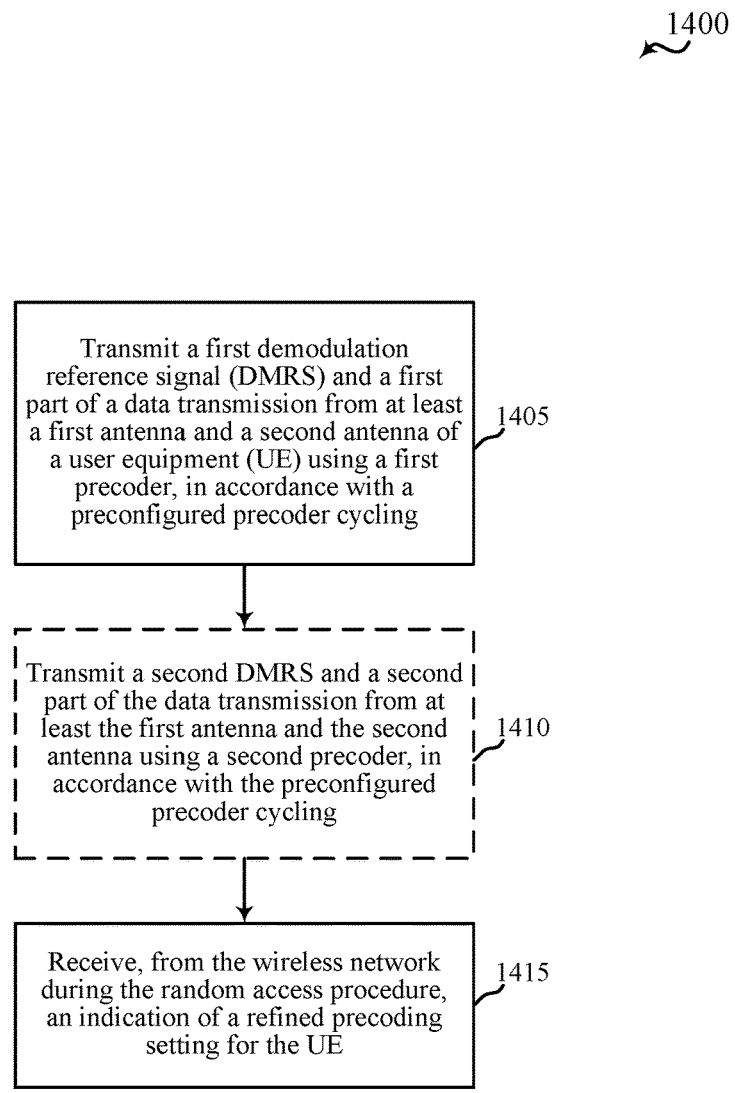

FIG. 14 is a flow chart illustrating an example of a method 1400 for wireless communication at a UE, in accordance with one or more aspects of the present disclosure. For clarity, the method 1400 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1405 and 1410, the method 1400 may include transmitting precoder selection signals from at least two antennas of the UE during performance of a random access procedure over a wireless network. More specifically, the method 1400 may include transmitting a first DMRS and a first part of a data transmission from at least a first antenna and a second antenna using a first precoder, in accordance with a preconfigured precoder cycling, at 1405, and transmitting a second DMRS and a second part of the data transmission from at least the first antenna and the second antenna using a second precoder, in accordance with the preconfigured precoder cycling, at 1410. The second precoder may be different from the first precoder. In some examples, the data transmission may include a data payload of an ePRACH transmission or an initial PUSCH transmission. The operation(s) at 1405 and 1410 may be performed using the wireless communication manager 520 as described with reference to FIG. 1, 5, 6, or 9, the random access manager 535 or precoder selection signal transmission manager 540 as described with reference to FIG. 5 or 6, or the precoder cycling manager 615 as described with reference to FIG. 6.

At 1415, the method 1400 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1415 may be performed using the wireless communication manager 520 as described with reference to FIG. 1, 5, 6, or 9, or the random access manager 535 or precoding manager 545 as described with reference to FIG. 5 or 6.

Figure 15:
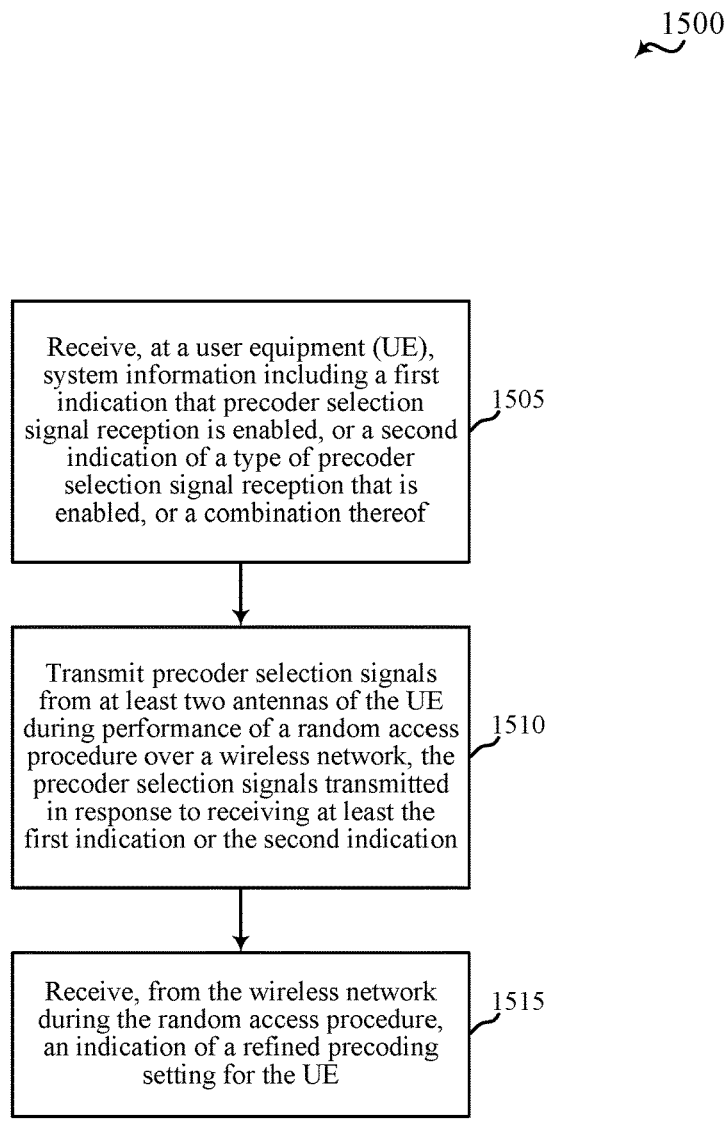

FIG. 15 is a flow chart illustrating an example of a method 1500 for wireless communication at a UE, in accordance with one or more aspects of the present disclosure. For clarity, the method 1500 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1505, the method 1500 may include receiving system information including a first indication that precoder selection signal reception is enabled, or a second indication of a type of precoder selection signal reception that is enabled, or a combination thereof. The operation(s) at 1505 may be performed using the wireless communication manager 520 as described with reference to FIG. 1, 5, 6, or 9, or the precoding manager 545 as described with reference to FIG. 5 or 6.

At 1510, the method 1500 may include transmitting precoder selection signals from at least two antennas of the UE during performance of a random access procedure over a wireless network. In some examples, the precoder selection signals may be transmitted in response to receiving at least the first indication or the second indication. The operation(s) at 1510 may be performed using the wireless communication manager 520 as described with reference to FIG. 1, 5, 6, or 9, or the random access manager 535 or precoder selection signal transmission manager 540 as described with reference to FIG. 5 or 6.

At 1515, the method 1500 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1515 may be performed using the wireless communication manager 520 as described with reference to FIG. 1, 5, 6, or 9, or the random access manager 535 or precoding manager 545 as described with reference to FIG. 5 or 6.

Figure 16:
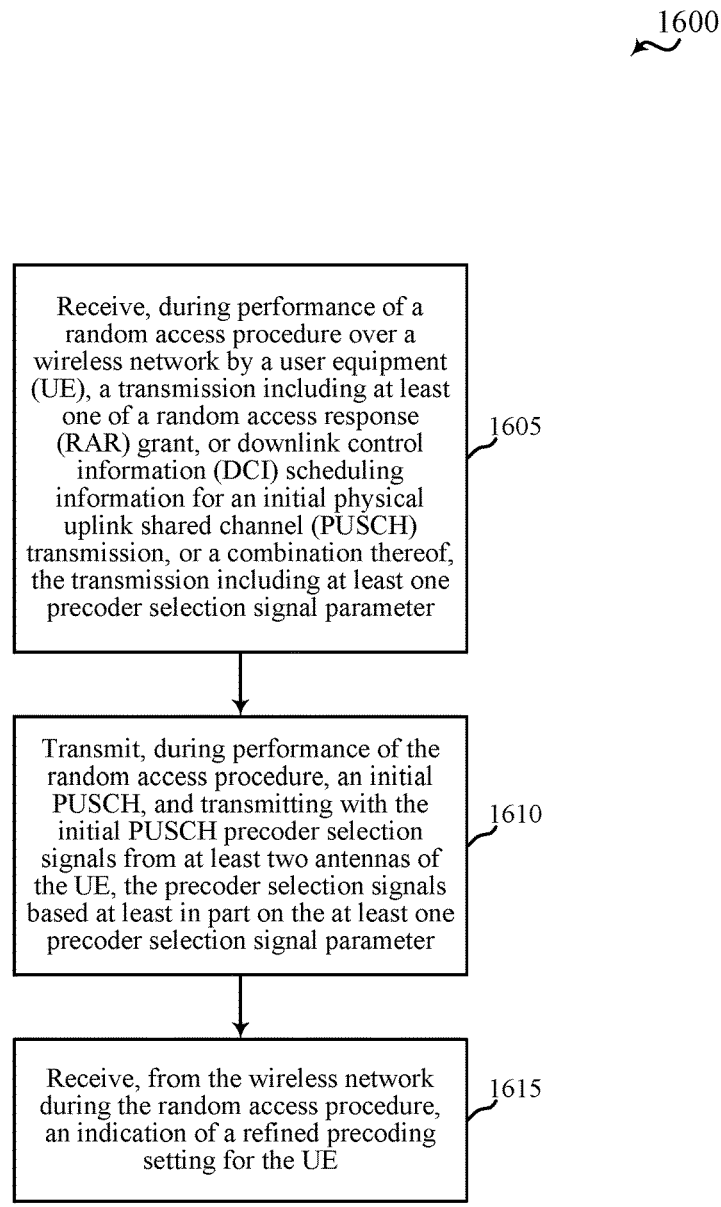

FIG. 16 is a flow chart illustrating an example of a method 1600 for wireless communication at a UE, in accordance with one or more aspects of the present disclosure. For clarity, the method 1600 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1605, the method 1600 may include receiving, during performance of a random access procedure over a wireless network, a transmission including at least one of a RAR grant, or DCI scheduling information for an initial PUSCH transmission, or a combination thereof. In some examples, the transmission may include at least one precoder selection signal parameter. The at least one precoder selection signal parameter may include a bandwidth of the precoder selection signals, or a cyclic shift of the precoder selection signals, or a number of antenna ports from which to transmit the precoder selection signals, or a combination thereof. The operation(s) at 1605 may be performed using the wireless communication manager 520 as described with reference to FIG. 1, 5, 6, or 9, or the random access manager 535 or precoder selection signal transmission manager 540 as described with reference to FIG. 5 or 6.

At 1610, the method 1600 may include transmitting, during performance of the random access procedure, an initial PUSCH. The operations at 1610 may also include transmitting, with the initial PUSCH, precoder selection signals from at least two antennas of the UE. In some examples, the precoder selection signals may be based at least in part on the at least one precoder selection signal parameter received at 1605. The operation(s) at 1610 may be performed using the wireless communication manager 520 as described with reference to FIG. 1, 5, 6, or 9, or the random access manager 535 or precoder selection signal transmission manager 540 as described with reference to FIG. 5 or 6.

At 1615, the method 1600 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1615 may be performed using the wireless communication manager 520 as described with reference to FIG. 1, 5, 6, or 9, or the random access manager 535 or precoding manager 545 as described with reference to FIG. 5 or 6.

Figure 17:
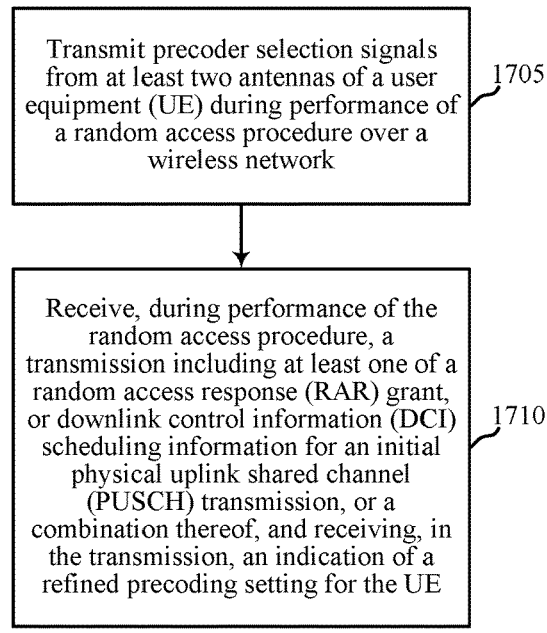

FIG. 17 is a flow chart illustrating an example of a method 1700 for wireless communication at a UE, in accordance with one or more aspects of the present disclosure. For clarity, the method 1700 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1705, the method 1700 may include transmitting precoder selection signals from at least two antennas of the UE during performance of a random access procedure over a wireless network. The operation(s) at 1705 may be performed using the wireless communication manager 520 as described with reference to FIG. 1, 5, 6, or 9, or the random access manager 535 or precoder selection signal transmission manager 540 as described with reference to FIG. 5 or 6.

At 1710, the method 1700 may include receiving, during performance of the random access procedure, a transmission including at least one of a RAR grant, or DCI scheduling information for an initial PUSCH transmission, or a combination thereof. The operations at 1710 may also include receiving, in the transmission, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1710 may be performed using the wireless communication manager 520 as described with reference to FIG. 1, 5, 6, or 9, or the random access manager 535 or precoding manager 545 as described with reference to FIG. 5 or 6.

Figure 18:
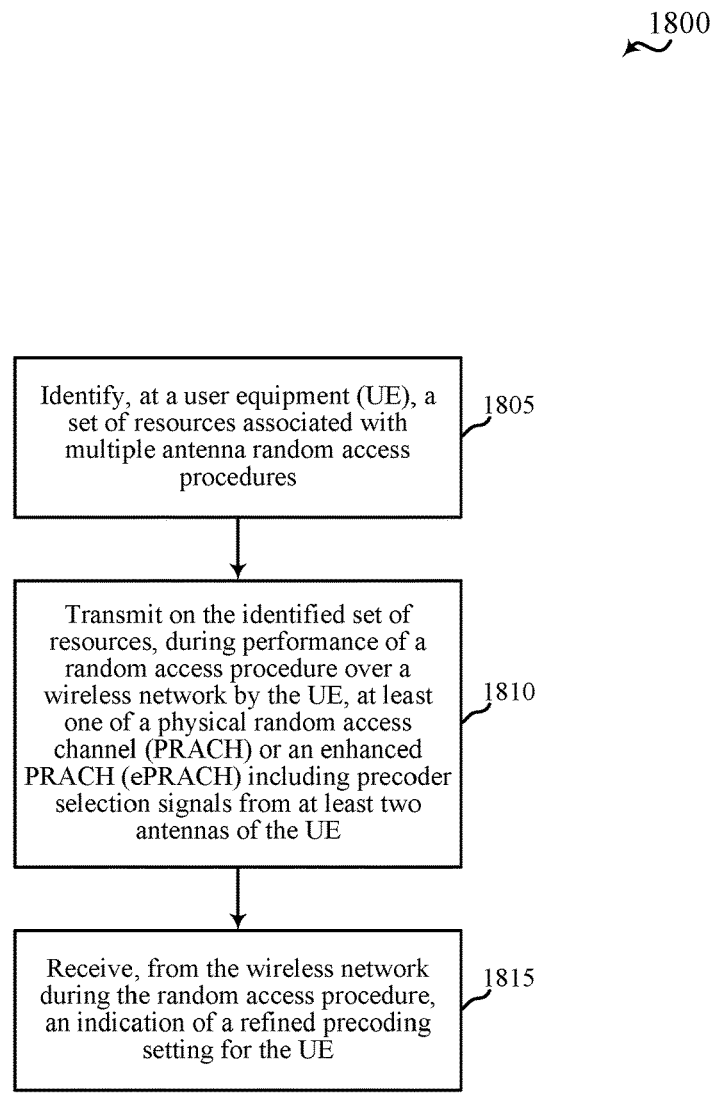

FIG. 18 is a flow chart illustrating an example of a method 1800 for wireless communication at a UE, in accordance with one or more aspects of the present disclosure. For clarity, the method 1800 is described below with reference to aspects of one or more of the UEs 115 as described with reference to FIG. 1, 2, 3, 4, or 9, aspects of the apparatus 515 as described with reference to FIG. 5, or aspects of one or more of the wireless communication managers 520 as described with reference to FIG. 1, 5, 6, or 9. In some examples, a UE may execute one or more sets of codes to control the functional elements of the UE to perform the functions described below. Additionally or alternatively, the UE may perform one or more of the functions described below using special-purpose hardware.

At 1805, the method 1800 may include identifying a set of resources associated with multiple antenna random access procedures. The operation(s) at 1805 may be performed using the wireless communication manager 520 as described with reference to FIG. 1, 5, 6, or 9, the random access manager 535 or precoder selection signal transmission manager 540 as described with reference to FIG. 5 or 6, or the random access resource selector 620 as described with reference to FIG. 6.

At 1810, the method 1800 may include transmitting at least one of a PRACH or an ePRACH on the identified set of resources, while performing a random access procedure over a wireless network. The operations at 1810 may also include transmitting precoder selection signals from at least two antennas of the UE during the random access procedure (e.g., with the PRACH or the ePRACH). In some examples, the precoder selection signals may be transmitted as described with reference to FIG. 12, 13, or 14. The operation(s) at 1810 may be performed using the wireless communication manager 520 as described with reference to FIG. 1, 5, 6, or 9, or the random access manager 535 or precoder selection signal transmission manager 540 as described with reference to FIG. 5 or 6.

At 1815, the method 1800 may include receiving, from the wireless network during the random access procedure, an indication of a refined precoding setting for the UE. In some examples, the refined precoding setting may be based at least in part on the precoder selection signals, or prior-transmitted precoder selection signals transmitted during a prior random access procedure performed by the UE, or a combination thereof. The operation(s) at 1815 may be performed using the wireless communication manager 520 as described with reference to FIG. 1, 5, 6, or 9, or the random access manager 535 or precoding manager 545 as described with reference to FIG. 5 or 6.

The methods 1100, 1200, 1300, 1400, 1500, 1600, 1700, and 1800 as described with reference to FIGS. 11, 12, 13, 14, 15, 16, 17, and 18 may provide for wireless communication. It should be noted that the methods 1100, 1200, 1300, 1400, 1500, 1600, 1700, and 1800 are example implementations, and the operations of the methods 1100, 1200, 1300, 1400, 1500, 1600, 1700, and 1800 may be rearranged, combined with other operations of the same or different method, or otherwise modified, such that other implementations are possible. Operations may also be added to the methods 1100, 1200, 1300, 1400, 1500, 1600, 1700, and 1800.

Figure 19:
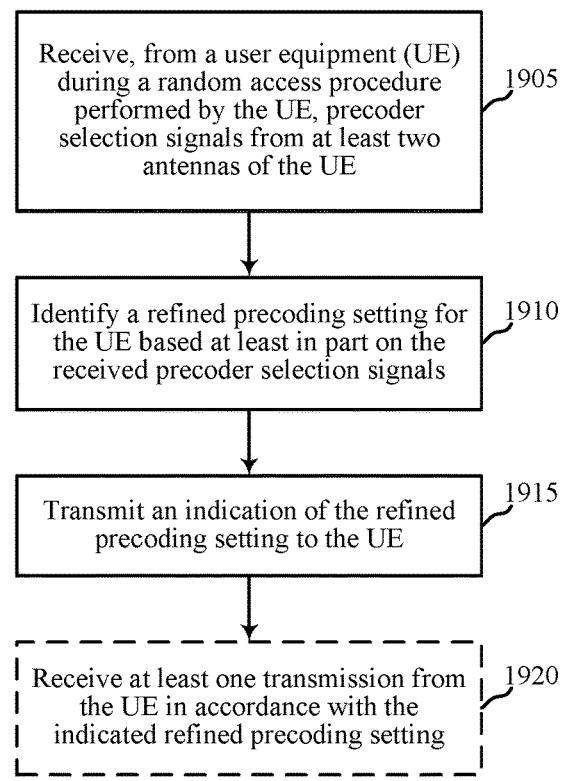
FIGS. 19-26 are flow charts illustrating examples of methods for wireless communication at a network access device, in accordance with one or more aspects of the present disclosure.

FIG. 19 is a flow chart illustrating an example of a method 1900 for wireless communication at a network access device, in accordance with one or more aspects of the present disclosure. For clarity, the method 1900 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 1905, the method 1900 may include receiving, from a UE during a random access procedure performed by the UE, precoder selection signals from at least two antennas of the UE. The operation(s) at 1905 may be performed using the wireless communication manager 720 as described with reference to FIG. 1, 7, 8, or 10, or the random access manager 735 or precoding refinement manager 740 as described with reference to FIG. 7 or 8.

At 1910, the method 1900 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 1910 may be performed using the wireless communication manager 720 as described with reference to FIG. 1, 7, 8, or 10, or the precoding refinement manager 740 as described with reference to FIG. 7 or 8.

At 1915, the method 1900 may include transmitting an indication of the refined precoding setting to the UE. The operation(s) at 1915 may be performed using the wireless communication manager 720 as described with reference to FIG. 1, 7, 8, or 10, or the random access manager 735 or precoding refinement manager 740 as described with reference to FIG. 7 or 8.

At 1920, the method 1900 may optionally receiving at least one transmission from the UE in accordance with the indicated refined precoding setting. In some examples, the at least one transmission may include at least one transmission in the random access procedure (e.g., an initial PUSCH transmission, or a retransmission of the initial PUSCH transmission, or a combination thereof) or at least one transmission following the random access procedure (e.g., a PUSCH transmission or a transmission that is part of a subsequent random access procedure). The operation(s) at 1920 may be performed using the wireless communication manager 720 as described with reference to FIG. 1, 7, 8, or 10, or the random access manager 735 as described with reference to FIG. 7 or 8.

Figure 20:
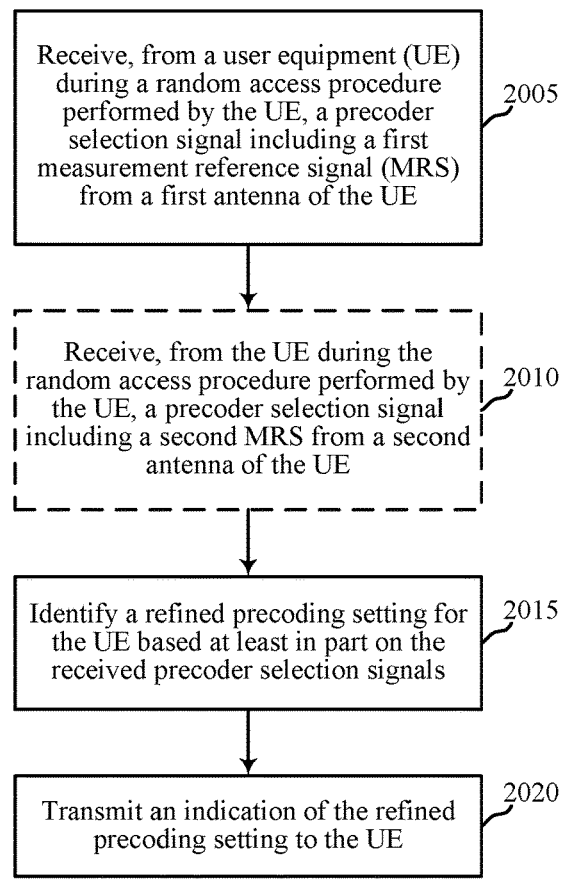

FIG. 20 is a flow chart illustrating an example of a method 2000 for wireless communication at a network access device, in accordance with one or more aspects of the present disclosure. For clarity, the method 2000 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2005 and 2010, the method 2000 may include receiving, from a UE during a random access procedure performed by the UE, precoder selection signals from at least two antennas of the UE. More specifically, the method 2000 may include receiving a first MRS from a first antenna of the UE at 2005, and receiving a second MRS from a second antenna of the UE at 2010. In some examples, the first MRS and the second MRS may be received with at least one of a PRACH transmission, or an ePRACH transmission, or an initial PUSCH transmission, or a combination thereof. The operation(s) at 2005 and 2010 may be performed using the wireless communication manager 720 as described with reference to FIG. 1, 7, 8, or 10, or the random access manager 735 or precoding refinement manager 740 as described with reference to FIG. 7 or 8, or the MRS reception manager 810 as described with reference to FIG. 8.

At 2015, the method 2000 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 2015 may be performed using the wireless communication manager 720 as described with reference to FIG. 1, 7, 8, or 10, or the precoding refinement manager 740 as described with reference to FIG. 7 or 8.

At 2020, the method 2000 may include transmitting an indication of the refined precoding setting to the UE. The operation(s) at 2020 may be performed using the wireless communication manager 720 as described with reference to FIG. 1, 7, 8, or 10, or the random access manager 735 or precoding refinement manager 740 as described with reference to FIG. 7 or 8.

Figure 21:
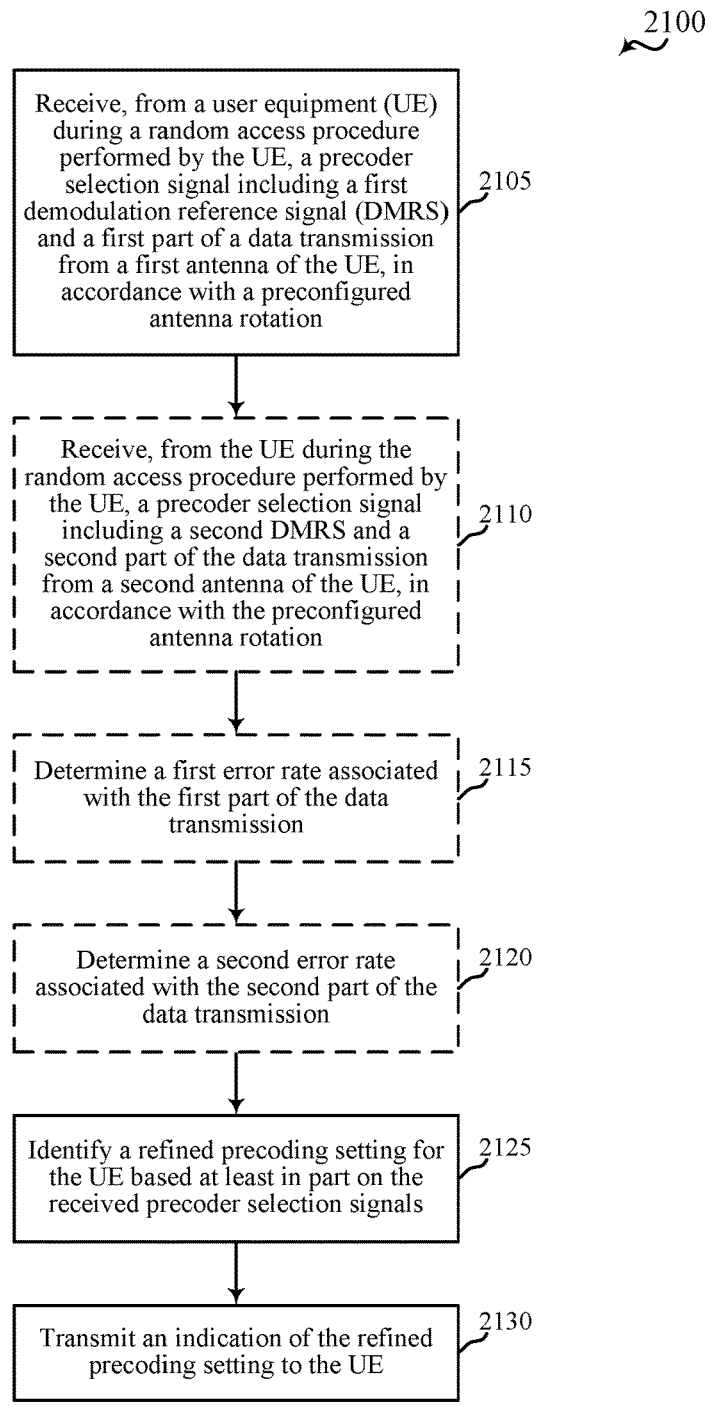

FIG. 21 is a flow chart illustrating an example of a method 2100 for wireless communication at a network access device, in accordance with one or more aspects of the present disclosure. For clarity, the method 2100 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2105 and 2110, the method 2100 may include receiving, from a UE during a random access procedure performed by the UE, precoder selection signals from at least two antennas of the UE. More specifically, the method 2100 may include receiving a first DMRS and a first part of a data transmission from a first antenna of the UE, in accordance with a preconfigured antenna rotation, at 2105, and receiving a second DMRS and a second part of the data transmission from a second antenna of the UE, in accordance with the preconfigured antenna rotation, at 2110. In some examples, the data transmission may include a data payload of an ePRACH transmission or an initial PUSCH transmission. The operation(s) at 2105 and 2110 may be performed using the wireless communication manager 720 as described with reference to FIG. 1, 7, 8, or 10, the random access manager 735 or precoding refinement manager 740 as described with reference to FIG. 7 or 8, or the antenna rotation manager 815 as described with reference to FIG. 8.

At 2115, the method 2100 may optionally include determining a first error rate associated with the first part of the data transmission. The operation(s) at 2115 may be performed using the wireless communication manager 720 as described with reference to FIG. 1, 7, 8, or 10, the random access manager 735 or precoding refinement manager 740 as described with reference to FIG. 7 or 8, or the error rate determiner 825 as described with reference to FIG. 8.

At 2120, the method 2100 may optionally include determining a second error rate associated with the second part of the data transmission. The operation(s) at 2120 may be performed using the wireless communication manager 720 as described with reference to FIG. 1, 7, 8, or 10, the random access manager 735 or precoding refinement manager 740 as described with reference to FIG. 7 or 8, or the error rate determiner 825 as described with reference to FIG. 8.

At 2125, the method 2100 may include identifying a refined precoding setting for the UE based at least in part on the received precoder selection signals (e.g., based at least in part on the first error rate associated with the first part of the data transmission and the second error rate associated with the second part of the data transmission). The refined precoding setting may also or alternatively be based at least in part on prior-received precoder selection signals received during a prior random access procedure performed by the UE. The operation(s) at 2125 may be performed using the wireless communication manager 720 as described with reference to FIG. 1, 7, 8, or 10, or the precoding refinement manager 740 as described with reference to FIG. 7 or 8.

At 2130, the method 2100 may include transmitting an indication of the refined precoding setting to the UE. The operation(s) at 2130 may be performed using the wireless communication manager 720 as described with reference to FIG. 1, 7, 8, or 10, or the random access manager 735 or precoding refinement manager 740 as described with reference to FIG. 7 or 8.

Figure 22:
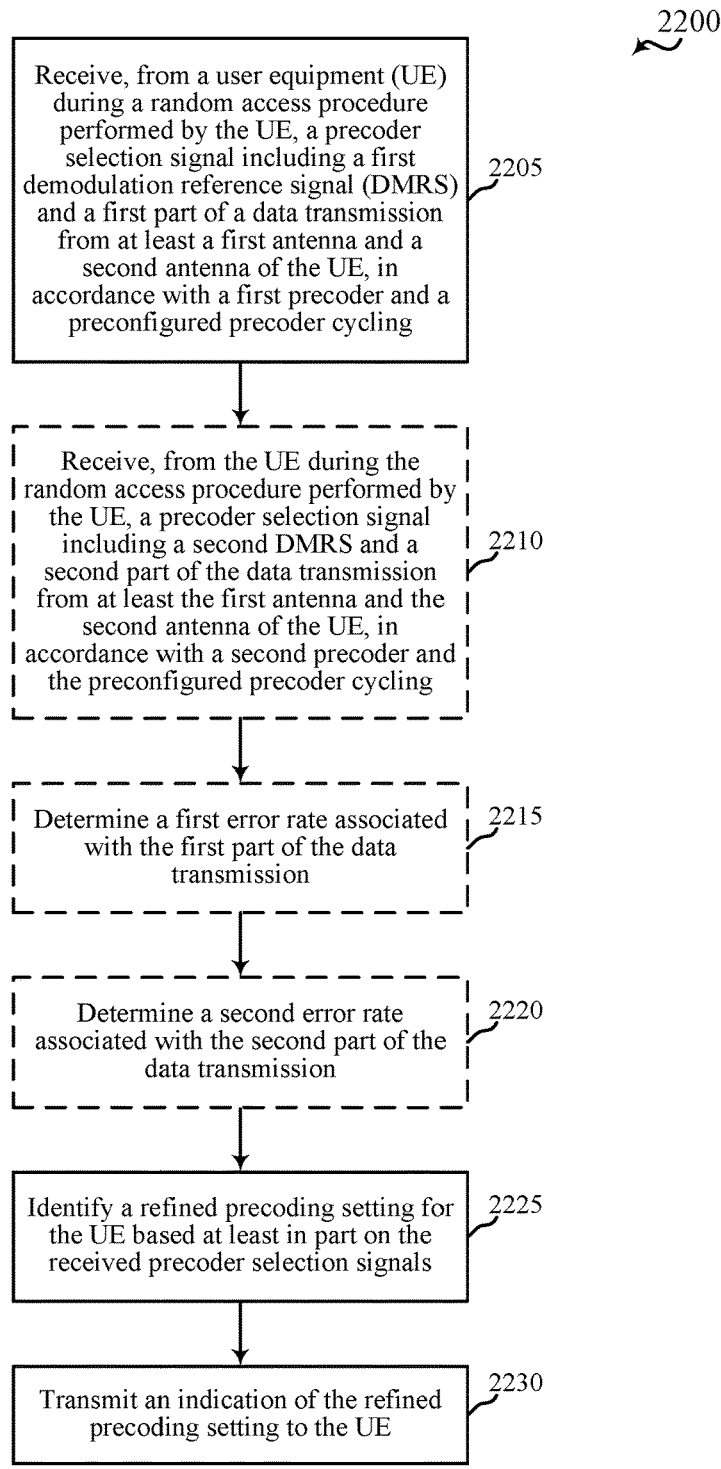

FIG. 22 is a flow chart illustrating an example of a method 2200 for wireless communication at a network access device, in accordance with one or more aspects of the present disclosure. For clarity, the method 2200 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2205 and 2210, the method 2200 may include receiving, from a UE during a random access procedure performed by the UE, precoder selection signals from at least two antennas of the UE. More specifically, the method 2200 may include receiving a first DMRS and a first part of a data transmission from at least a first antenna and a second antenna of the UE, in accordance with a first precoder and a preconfigured precoder cycling, at 2205, and receiving a second DMRS and a second part of the data transmission from at least the first antenna and the second antenna of the UE, in accordance with a second precoder and the preconfigured precoder cycling, at 2210. The second precoder may be different from the first precoder. In some examples, the data transmission may include a data payload of an ePRACH transmission or an initial PUSCH transmission. The operation(s) at 2205 and 2210 may be performed using the wireless communication manager 720 as described with reference to FIG. 1, 7, 8, or 10, the random access manager 735 or precoding refinement manager 740 as described with reference to FIG. 7 or 8, or the precoder cycling manager 820 as described with reference to FIG. 8.

At 2215, the method 2200 may optionally include determining a first error rate associated with the first part of the data transmission. The operation(s) at 2215 may be performed using the wireless communication manager 720 as described with reference to FIG. 1, 7, 8, or 10, the random access manager 735 or precoding refinement manager 740 as described with reference to FIG. 7 or 8, or the error rate determiner 825 as described with reference to FIG. 8.

At 2220, the method 2200 may optionally include determining a second error rate associated with the second part of the data transmission. The operation(s) at 2220 may be performed using the wireless communication manager 720 as described with reference to FIG. 1, 7, 8, or 10, the random access manager 735 or precoding refinement manager 740 as described with reference to FIG. 7 or 8, or the error rate determiner 825 as described with reference to FIG. 8.

At 2225, the method 2200 may include identifying a refined precoding setting for the UE based at least in part on the received precoder selection signals (e.g., based at least in part on the first error rate associated with the first part of the data transmission and the second error rate associated with the second part of the data transmission). The refined precoding setting may also or alternatively be based at least in part on prior-received precoder selection signals received during a prior random access procedure performed by the UE. The operation(s) at 2225 may be performed using the wireless communication manager 720 as described with reference to FIG. 1, 7, 8, or 10, or the precoding refinement manager 740 as described with reference to FIG. 7 or 8.

At 2230, the method 2200 may include transmitting an indication of the refined precoding setting to the UE. The operation(s) at 2230 may be performed using the wireless communication manager 720 as described with reference to FIG. 1, 7, 8, or 10, or the random access manager 735 or precoding refinement manager 740 as described with reference to FIG. 7 or 8.

Figure 23:
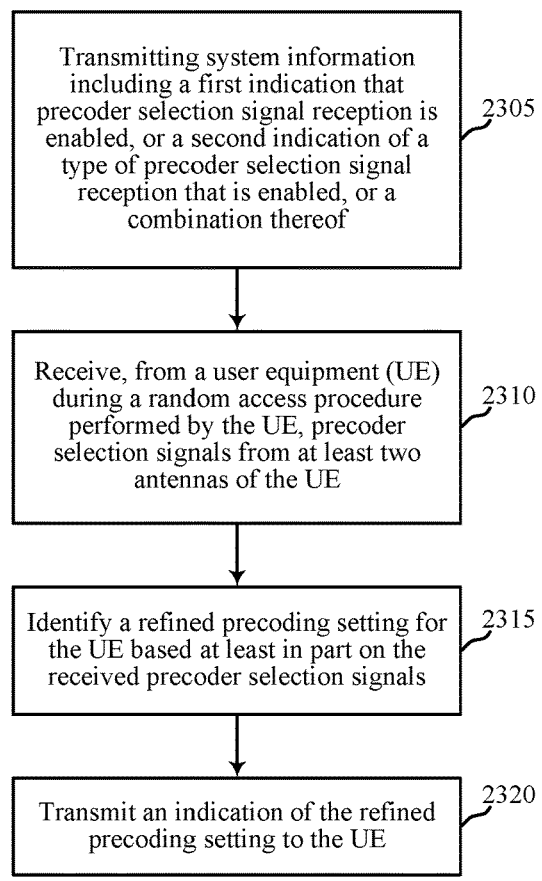

FIG. 23 is a flow chart illustrating an example of a method 2300 for wireless communication at a network access device, in accordance with one or more aspects of the present disclosure. For clarity, the method 2300 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2305, the method 2300 may include transmitting system information including a first indication that precoder selection signal reception is enabled, or a second indication of a type of precoder selection signal reception that is enabled, or a combination thereof. The operation(s) at 2305 may be performed using the wireless communication manager 720 as described with reference to FIG. 1, 7, 8, or 10, or the precoding refinement manager 740 as described with reference to FIG. 7 or 8.

At 2310, the method 2300 may include receiving, from a UE during a random access procedure performed by the UE, precoder selection signals from at least two antennas of the UE. In some examples, the precoder selection signals may be received in response to transmitting at least the first indication or the second indication. The operation(s) at 2310 may be performed using the wireless communication manager 720 as described with reference to FIG. 1, 7, 8, or 10, or the random access manager 735 or precoding refinement manager 740 as described with reference to FIG. 7 or 8.

At 2315, the method 2300 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 2315 may be performed using the wireless communication manager 720 as described with reference to FIG. 1, 7, 8, or 10, or the precoding refinement manager 740 as described with reference to FIG. 7 or 8.

At 2320, the method 2300 may include transmitting an indication of the refined precoding setting to the UE. The operation(s) at 2320 may be performed using the wireless communication manager 720 as described with reference to FIG. 1, 7, 8, or 10, or the random access manager 735 or precoding refinement manager 740 as described with reference to FIG. 7 or 8.

Figure 24:
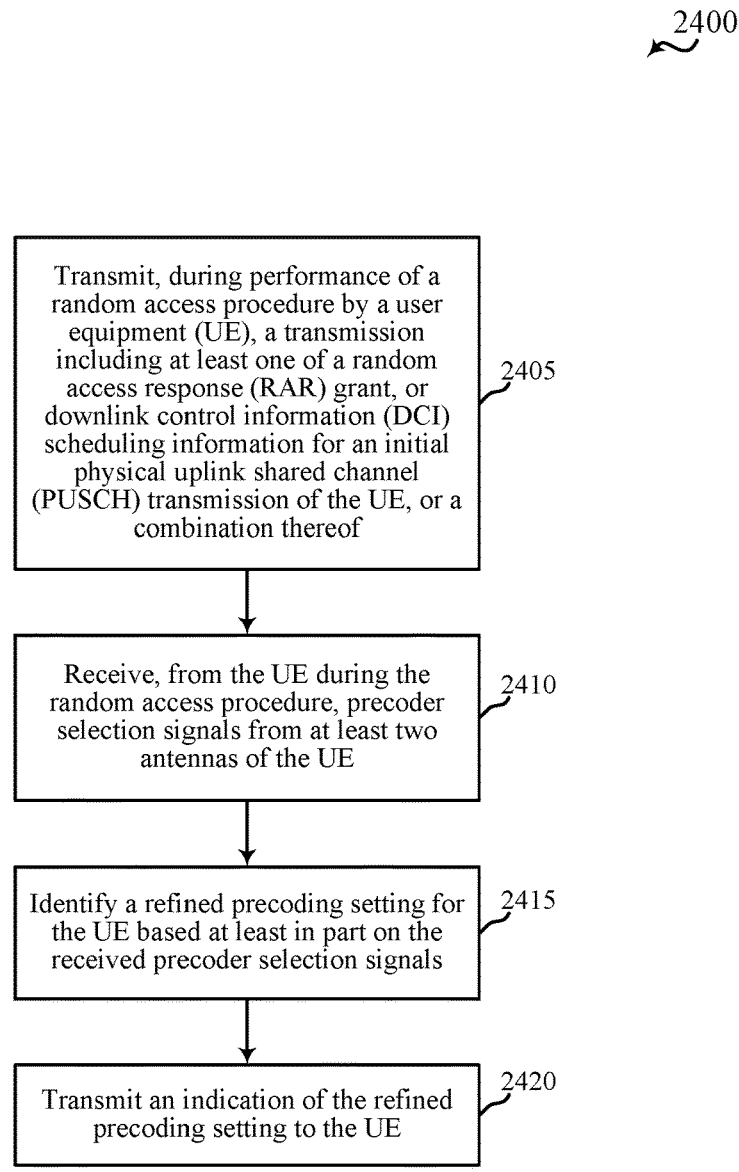

FIG. 24 is a flow chart illustrating an example of a method 2400 for wireless communication at a network access device, in accordance with one or more aspects of the present disclosure. For clarity, the method 2400 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2405, the method 2400 may include transmitting, during performance of a random access procedure by a UE, a transmission including at least one of a RAR grant, or DCI scheduling information for an initial PUSCH transmission of the UE, or a combination thereof. In some examples, the transmission may include at least one precoder selection signal parameter. The at least one precoder selection signal parameter may include a bandwidth of the precoder selection signals, or a cyclic shift of the precoder selection signals, or a number of antenna ports from which to transmit the precoder selection signals, or a combination thereof. The operation(s) at 2405 may be performed using the wireless communication manager 720 as described with reference to FIG. 1, 7, 8, or 10, or the random access manager 735 or precoding refinement manager 740 as described with reference to FIG. 7 or 8.

At 2410, the method 2400 may include receiving, from the UE during the random access procedure, precoder selection signals from at least two antennas of the UE. In some examples, the precoder selection signals may be based at least in part on the at least one precoder selection signal parameter transmitted at 2405. The operation(s) at 2410 may be performed using the wireless communication manager 720 as described with reference to FIG. 1, 7, 8, or 10, or the random access manager 735 or precoding refinement manager 740 as described with reference to FIG. 7 or 8.

At 2415, the method 2400 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 2415 may be performed using the wireless communication manager 720 as described with reference to FIG. 1, 7, 8, or 10, or the precoding refinement manager 740 as described with reference to FIG. 7 or 8.

At 2420, the method 2400 may include transmitting an indication of the refined precoding setting to the UE. The operation(s) at 2420 may be performed using the wireless communication manager 720 as described with reference to FIG. 1, 7, 8, or 10, or the random access manager 735 or precoding refinement manager 740 as described with reference to FIG. 7 or 8.

Figure 25:
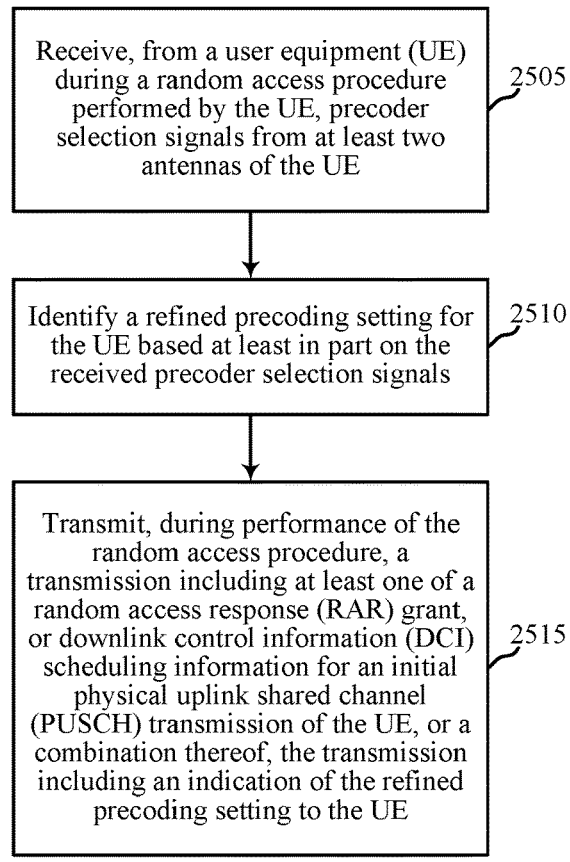

FIG. 25 is a flow chart illustrating an example of a method 2500 for wireless communication at a network access device, in accordance with one or more aspects of the present disclosure. For clarity, the method 2500 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2505, the method 2500 may include receiving, from a UE during a random access procedure performed by the UE, precoder selection signals from at least two antennas of the UE. The operation(s) at 2505 may be performed using the wireless communication manager 720 as described with reference to FIG. 1, 7, 8, or 10, or the random access manager 735 or precoding refinement manager 740 as described with reference to FIG. 7 or 8.

At 2510, the method 2500 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 2510 may be performed using the wireless communication manager 720 as described with reference to FIG. 1, 7, 8, or 10, or the precoding refinement manager 740 as described with reference to FIG. 7 or 8.

At 2515, the method 2500 may include transmitting, during performance of the random access procedure by the UE, a transmission including at least one of a RAR grant, or DCI scheduling information for an initial PUSCH transmission of the UE, or a combination thereof. In some examples, the transmission may include an indication of the refined precoding setting for the UE. The operation(s) at 2515 may be performed using the wireless communication manager 720 as described with reference to FIG. 1, 7, 8, or 10, or the random access manager 735 or precoding refinement manager 740 as described with reference to FIG. 7 or 8.

Figure 26:
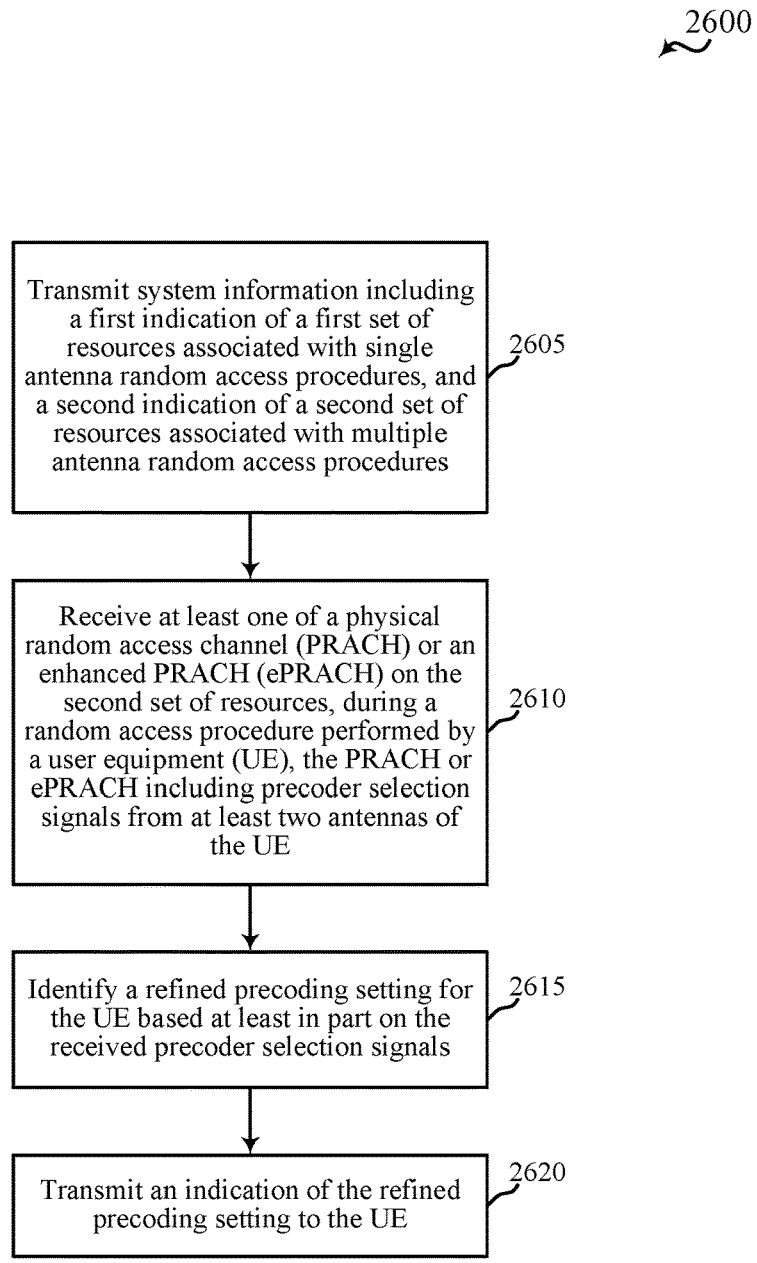

FIG. 26 is a flow chart illustrating an example of a method 2600 for wireless communication at a network access device, in accordance with one or more aspects of the present disclosure. For clarity, the method 2600 is described below with reference to aspects of one or more of the network access devices 105 as described with reference to FIG. 1, 2, 3, 4, or 10, aspects of the apparatus 705 as described with reference to FIG. 7, or aspects of one or more of the wireless communication managers 720 as described with reference to FIG. 1, 7, 8, or 10. In some examples, a network access device may execute one or more sets of codes to control the functional elements of the network access device to perform the functions described below. Additionally or alternatively, the network access device may perform one or more of the functions described below using special-purpose hardware.

At 2605, the method 2600 may include transmitting system information including a first indication of a first set of resources associated with single antenna random access procedures, and a second indication of a second set of resources associated with multiple antenna random access procedures. The operation(s) at 2605 may be performed using the wireless communication manager 720 as described with reference to FIG. 1, 7, 8, or 10, or the random access resource allocator 805 as described with reference to FIG. 8.

At 2610, the method 2600 may include receiving at least one of a PRACH or an ePRACH on the second set of resources during a random access procedure performed by a UE. The operations at 2610 may also include receiving precoder selection signals from at least two antennas of the UE during the random access procedure (e.g., with the PRACH or the ePRACH). In some examples, the precoder selection signals may be received as described with reference to FIG. 20, 21, or 22. The operation(s) at 2610 may be performed using the wireless communication manager 720 as described with reference to FIG. 1, 7, 8, or 10, or the random access manager 735 or precoding refinement manager 740 as described with reference to FIG. 7 or 8.

At 2615, the method 2600 may include identifying a refined precoding setting for the UE based at least in part on the received precoder selection signals. The refined precoding setting may also or alternatively be based at least in part on prior-received precoder selection signals received during a prior random access procedure performed by the UE. The operation(s) at 2615 may be performed using the wireless communication manager 720 as described with reference to FIG. 1, 7, 8, or 10, or the precoding refinement manager 740 as described with reference to FIG. 7 or 8.

At 2620, the method 2600 may include transmitting an indication of the refined precoding setting to the UE. The operation(s) at 2620 may be performed using the wireless communication manager 720 as described with reference to FIG. 1, 7, 8, or 10, or the random access manager 735 or precoding refinement manager 740 as described with reference to FIG. 7 or 8.

The methods 1900, 2000, 2100, 2200, 2300, 2400, 2500, and 2600 as described with reference to FIGS. 19, 20, 21, 22, 23, 24, 25, and 26 may provide for wireless communication. It should be noted that the methods 1900, 2000, 2100, 2200, 2300, 2400, 2500, and 2600 are example implementations, and the operations of the methods 1900, 2000, 2100, 2200, 2300, 2400, 2500, and 2600 may be rearranged, combined with other operations of the same or different method, or otherwise modified, such that other implementations are possible. Operations may also be added to the methods 1900, 2000, 2100, 2200, 2300, 2400, 2500, and 2600.

Techniques described herein may be used for various wireless communication systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A may be referred to as CDMA2000 1x, 1x, etc. IS-856 (TIA-856) may be referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP LTE and LTE-A are new releases of UMTS that use E-UTRA. UTRA, E-UTRA, UMTS, LTE, LTE-A, and GSM are described in documents from an organization named 3GPP. CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over an unlicensed or shared bandwidth. The description above, however, describes an LTE/LTE-A system for purposes of example, and LTE terminology is used in much of the description above, although the techniques are applicable beyond LTE/LTE-A applications.

The detailed description set forth above in connection with the appended drawings describes examples and does not represent all of the examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, the phrase "based on" shall not be construed as a reference to a closed set of conditions. For example, an exemplary feature that is described as "based on condition A" may be based on both a condition A and a condition B without departing from the scope of the present disclosure. In other words, as used herein, the phrase "based on" shall be construed in the same manner as the phrase "based at least in part on."

The previous description of the disclosure is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel techniques disclosed herein.

What is claimed is:

1. A method for wireless communication at a network access device, comprising:
receiving, from a user equipment (UE) during a random access procedure performed by the UE, precoder selection signals from at least two antennas of the UE, at least one of the precoder selection signals comprising a first measurement reference signal (MRS) from a first antenna of the UE;
determining a refined precoding setting based at least in part on the first MRS and the received precoder selection signals; and
transmitting an indication of the refined precoding setting to the UE.

2. The method of claim 1, wherein at least one of the precoder selection signals comprises a second MRS from a second antenna of the UE.

3. The method of claim 1, wherein the first MRS is received with at least one of:
   a physical random access channel (PRACH) transmission, or an enhanced PRACH (ePRACH) transmission, or an initial physical uplink shared channel (PUSCH) transmission, or a combination thereof.

4. The method of claim 1, further comprising:
   receiving, from the UE during the random access procedure, an ePRACH transmission or an initial PUSCH transmission using a first precoder based at least in part on the indication of the refined precoding setting, or a second precoder used by the UE during a prior successful random access procedure.

5. The method of claim 1, further comprising transmitting the indication of the refined precoding setting to be applied to a transmission during the random access procedure.

6. The method of claim 1, further comprising transmitting the indication of the refined precoding setting to be applied to a transmission following the random access procedure.

7. A method for wireless communication at a network access device, comprising:
   receiving, from a user equipment (UE) during a random access procedure performed by the UE, precoder selection signals from at least two antennas of the UE;
   identifying a refined precoding setting for the UE based at least in part on the received precoder selection signals; and
   transmitting an indication of the refined precoding setting to the UE.

8. The method of claim 7, further comprising:
   transmitting, during performance of the random access procedure, a transmission comprising at least one of: a random access response (RAR) grant, downlink control information (DCI) scheduling information for an initial physical uplink shared channel (PUSCH) transmission of the UE, or a combination thereof.

9. The method of claim 8, wherein the transmission comprises at least one precoder selection signal parameter, the at least one precoder selection signal parameter comprising:
   a bandwidth of the precoder selection signals, a cyclic shift of the precoder selection signals, a number of antenna ports from which to transmit the precoder selection signals, or a combination thereof.

10. The method of claim 9, wherein the transmission comprises the indication of the refined precoding setting.

11. The method of claim 7, further comprising:
    receiving at least one transmission from the UE in accordance with the indicated refined precoding setting, the at least one transmission comprising: an initial PUSCH transmission, a retransmission of the initial PUSCH transmission, or a combination thereof.

12. The method of claim 7, wherein the refined precoding setting is identified based at least in part on:
    the precoder selection signals, prior-transmitted precoder selection signals transmitted during a prior random access procedure, or a combination thereof.

13. A method for wireless communication at a network access device, comprising:
    receiving, from a user equipment (UE) during a random access procedure performed by the UE, precoder selection signals from at least two antennas of the UE; and
    transmitting an indication of a refined precoding setting to the UE based at least in part on the received precoder selection signals; and
    transmitting system information including a first indication of a first set of resources associated with a single antenna random access procedure and a second indication of a second set of resources associated with multiple antenna random access procedures.

14. The method of claim 13, further comprising:
    transmitting system information including: a first indication that precoder selection signal reception is enabled, a second indication of a type of precoder selection signal reception that is enabled, or a combination thereof, wherein the precoder selection signals are received in response to transmitting at least the first indication or the second indication.

15. The method of claim 13, further comprising identifying a capability of the UE based at least in part on the received precoder selection signals.

16. The method of claim 15, wherein the precoder selection signals are received with at least one of:
    a physical random access channel (PRACH) transmission, or an enhanced PRACH (ePRACH) transmission, or an initial physical uplink shared channel (PUSCH) transmission, or a combination thereof.

17. A method for wireless communication at a network access device, comprising:
    receiving, from a user equipment (UE) during a random access procedure performed by the UE, precoder selection signals from at least two antennas of the UE, the precoder selection signals comprising a first demodulation reference signal (DMRS) and a first part of a data transmission received from at least a first antenna of the UE in accordance with a first precoder and a preconfigured precoder cycling; and
    transmitting an indication of a refined precoding setting to the UE based at least in part on the received precoder selection signals.

18. The method of claim 17, wherein the precoder selection signals further comprise a second DMRS and a second part of the data transmission received from at least a second antenna of the UE, in accordance with a second precoder and the preconfigured precoder cycling, the second precoder being different from the first precoder.

19. The method of claim 18, wherein receiving the precoder selection signals comprises:
    receiving the first DMRS and the first part of the data transmission from the first antenna of the UE, in accordance with a preconfigured antenna rotation; and
    receiving the second DMRS and the second part of the data transmission from the second antenna of the UE, in accordance with the preconfigured antenna rotation.

20. The method of claim 18, further comprising:
    determining a first error rate associated with the first part of the data transmission; and
    determining a second error rate associated with the second part of the data transmission,
    wherein the indication of the refined precoding setting is based at least in part on the first error rate and the second error rate.

21. The method of claim 17, wherein the data transmission comprises a data payload of an ePRACH transmission or an initial physical uplink shared channel (PUSCH) transmission.

22. A method for wireless communication at a user equipment (UE), comprising:
    transmitting, during a random access procedure, precoder selection signals from at least two antennas of the UE, at least one of the precoder selection signals comprising a first measurement reference signal (MRS) from a first antenna of the UE; and receiving, during the random access procedure, an indication of a refined precoding setting based at least in part on the transmitted precoder selection signals comprising the first MRS.

23. The method of claim 22, wherein at least one of the precoder selection signals comprises a second MRS from a second antenna of the UE.

24. The method of claim 22, wherein the first MRS is transmitted with at least one of:
a physical random access channel (PRACH) transmission, or an enhanced PRACH (ePRACH) transmission, or an initial physical uplink shared channel (PUSCH) transmission, or a combination thereof.

25. The method of claim 22, further comprising:
transmitting, during the random access procedure, an ePRACH transmission or an initial PUSCH transmission using a first precoder based at least in part on the indication of the refined precoding setting, or a second precoder used by the UE during a prior successful random access procedure.

26. The method of claim 22, further comprising applying the refined precoding setting to a transmission during the random access procedure.

27. The method of claim 22, further comprising applying the refined precoding setting to a transmission following the random access procedure.

28. A method for wireless communication at a user equipment (UE), comprising:
transmitting, during a random access procedure, precoder selection signals from at least two antennas of the UE;
receiving, during the random access procedure, a transmission comprising a refined precoding setting based at least in part on the transmitted precoder selection signals.

29. The method of claim 28, wherein the transmission comprises at least one of:
a random access response (RAR) grant, downlink control information (DCI) scheduling information for an initial physical uplink shared channel (PUSCH) transmission of the UE, or a combination thereof.

30. The method of claim 29, wherein the transmission comprises at least one precoder selection signal parameter, the at least one precoder selection signal parameter comprising:
a bandwidth of the precoder selection signals, a cyclic shift of the precoder selection signals, a number of antenna ports from which to transmit the precoder selection signals, or a combination thereof.

31. The method of claim 28, further comprising:
transmitting, during performance of the random access procedure, an initial PUSCH transmission, a retransmission of the initial PUSCH transmission, or a combination thereof comprising the precoder selection signals,
wherein the precoder selection signals are transmitted with the initial PUSCH transmission and are based at least in part on at least one precoder selection signal parameter.

32. The method of claim 28, wherein the refined precoding setting is based at least in part on:
the precoder selection signals, prior-transmitted precoder selection signals transmitted during a prior random access procedure, or a combination thereof.

33. A method for wireless communication at a user equipment (UE), comprising:

transmitting, during a random access procedure, precoder selection signals from at least two antennas of the UE; and
receiving, during the random access procedure, an indication of a refined precoding setting based at least in part on the transmitted precoder selection signals; and
receiving system information including a first indication of a first set of resources associated with a single antenna random access procedure and a second indication of a second set of resources associated with multiple antenna random access procedures.

34. The method of claim 33, further comprising:
identifying a set of resources associated with multiple antenna random access procedures based at least in part on receiving the system information,
wherein the random access procedure comprises transmitting at least one of a PRACH or an ePRACH on the identified set of resources.

35. The method of claim 33, further comprising:
receiving system information including: a first indication that precoder selection signal reception is enabled, a second indication of a type of precoder selection signal reception that is enabled, or a combination thereof,
wherein the precoder selection signals are transmitted in response to receiving at least the first indication or the second indication.

36. The method of claim 33, wherein the precoder selection signals are transmitted with at least one of:
a physical random access channel (PRACH) transmission, or an enhanced PRACH (ePRACH) transmission, or an initial physical uplink shared channel (PUSCH) transmission, or a combination thereof.

37. A method for wireless communication at a user equipment (UE), comprising:
transmitting, during a random access procedure, precoder selection signals from at least two antennas of the UE, the precoder selection signals comprising a first demodulation reference signal (DMRS) and a first part of a data transmission transmitted from at least a first antenna of the UE in accordance with a first precoder and a preconfigured precoder cycling; and
receiving, during the random access procedure, an indication of a refined precoding setting based at least in part on the received precoder selection signals.

38. The method of claim 37, wherein the precoder selection signals further comprise a second DMRS and a second part of the data transmission transmitted from at least a second antenna of the UE, in accordance with a second precoder and the preconfigured precoder cycling, the second precoder being different from the first precoder.

39. The method of claim 38, wherein transmitting the precoder selection signals comprises:
transmitting the first DMRS and the first part of the data transmission from the first antenna of the UE, in accordance with a preconfigured antenna rotation; and
transmitting the second DMRS and the second part of the data transmission from the second the UE, in accordance with the preconfigured antenna rotation.

40. The method of claim 37, wherein the indication of the refined precoding setting is based at least in part on a first error rate and a second error rate.

41. The method of claim 37, wherein the data transmission comprises a data payload of an ePRACH transmission or an initial physical uplink shared channel (PUSCH) transmission.

* * * * *